United States Patent
Robbins et al.

(10) Patent No.: US 9,377,623 B2
(45) Date of Patent: Jun. 28, 2016

(54) WAVEGUIDE EYE TRACKING EMPLOYING VOLUME BRAGG GRATING

(71) Applicant: Microsoft Technology Licensing, LLC, Redmond, WA (US)

(72) Inventors: Steven Robbins, Redmond, WA (US); Ian A. Nguyen, Renton, WA (US); Xinye Lou, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/456,512

(22) Filed: Aug. 11, 2014

(65) Prior Publication Data

US 2016/0041384 A1    Feb. 11, 2016

(51) Int. Cl.
*G09G 5/00* (2006.01)
*G02B 27/00* (2006.01)
*G02B 27/01* (2006.01)
(Continued)

(52) U.S. Cl.
CPC .............. *G02B 27/0093* (2013.01); *G02B 5/18* (2013.01); *G02B 27/017* (2013.01); *G02B 27/0172* (2013.01); *G06F 3/013* (2013.01)

(58) Field of Classification Search
CPC .. G06F 3/013; G02B 27/093; G02B 27/0172; G02B 2027/0138; G02B 6/34; A61B 3/113
USPC ........ 345/8, 32, 156; 382/117; 385/2, 10, 16, 385/31, 37, 117; 359/22, 35, 569, 643
See application file for complete search history.

(56) References Cited

U.S. PATENT DOCUMENTS 3,861,784 A    1/1975    Torok
4,235,504 A    11/1980    Ikeda et al.
(Continued)

FOREIGN PATENT DOCUMENTS

CA    1174882 A1    9/1984
EP    2290428 A2    2/2011
(Continued)

OTHER PUBLICATIONS

Office Action dated Jan. 7, 2015, in U.S. Appl. No. 14/140,987, filed Dec. 26, 2013.
(Continued)

*Primary Examiner* — Prabodh M Dharia
(74) *Attorney, Agent, or Firm* — Dan Choi; Judy Yee; Micky Minhas

(57) ABSTRACT

A transparent waveguide, which is for use in tracking an eye that is illuminated by infrared light having an infrared wavelength, includes a volume Bragg grating type of input-coupler adapted to receive infrared light having the infrared wavelength and couple the received infrared light into the waveguide. The volume Bragg grating includes a lower boundary and an upper boundary that is closer to the output-coupler than the lower boundary. A k-vector angle of the volume Bragg grating at the lower boundary is greater than a k-vector angle at the upper boundary, with k-vector angles of the volume Bragg grating between the lower and upper boundaries gradually decreasing as distances decrease between grating planes of the volume Bragg grating and the upper boundary. Additionally, the volume Bragg grating preferably has an angular bandwidth that is no greater than 5 degrees.

14 Claims, 9 Drawing Sheets

(51) Int. Cl.
*G06F 3/01* (2006.01)
*G02B 5/18* (2006.01)

(56) References Cited

U.S. PATENT DOCUMENTS

| | | | |
|---|---|---|---|
| 4,711,512 A | 12/1987 | Upatnieks | |
| 5,383,042 A * | 1/1995 | Robinson | G06N 3/067 349/17 |
| 5,440,669 A * | 8/1995 | Rakuljic | G02B 5/1857 359/1 |
| 5,491,570 A * | 2/1996 | Rakuljic | G02B 5/1857 359/1 |
| 5,596,451 A | 1/1997 | Handschy et al. | |
| 5,614,988 A * | 3/1997 | Kato | G03F 7/70241 355/46 |
| 5,701,132 A | 12/1997 | Kollin et al. | |
| 5,856,842 A | 1/1999 | Tedesco | |
| 5,886,822 A | 3/1999 | Spitzer | |
| 5,966,223 A | 10/1999 | Friesem et al. | |
| 5,986,746 A * | 11/1999 | Metz | A61B 5/1172 356/71 |
| 6,285,813 B1 | 9/2001 | Schultz et al. | |
| 6,323,970 B1 | 11/2001 | Popovich | |
| 6,529,331 B2 | 3/2003 | Massof et al. | |
| 6,580,529 B1 | 6/2003 | Amitai et al. | |
| 6,804,066 B1 | 10/2004 | Ha et al. | |
| 7,184,615 B2 | 2/2007 | Levola | |
| 7,190,859 B2 * | 3/2007 | Greiner | G02B 5/203 359/10 |
| 7,205,960 B2 | 4/2007 | David | |
| 7,283,705 B2 | 10/2007 | Paek et al. | |
| 7,401,920 B1 | 7/2008 | Kranz et al. | |
| 7,576,916 B2 | 8/2009 | Amitai | |
| 7,619,739 B1 * | 11/2009 | Sutherland | G01N 21/774 356/432 |
| 7,660,047 B1 | 2/2010 | Travis et al. | |
| 7,907,342 B2 | 3/2011 | Simmonds et al. | |
| 8,068,709 B2 | 11/2011 | Iazikov et al. | |
| 8,160,411 B2 | 4/2012 | Levola et al. | |
| 8,233,204 B1 | 7/2012 | Robbins et al. | |
| 8,432,589 B2 * | 4/2013 | Tompkin | B44F 1/10 359/2 |
| 8,487,838 B2 | 7/2013 | Lewis et al. | |
| 8,611,014 B2 | 12/2013 | Valera et al. | |
| 8,638,498 B2 | 1/2014 | Bohn et al. | |
| 8,817,350 B1 | 8/2014 | Robbins et al. | |
| 2003/0184868 A1 | 10/2003 | Geist | |
| 2005/0105084 A1 * | 5/2005 | Wang | G01J 3/02 356/301 |
| 2006/0132914 A1 | 6/2006 | Weiss et al. | |
| 2007/0041684 A1 | 2/2007 | Popovich et al. | |
| 2008/0129530 A1 * | 6/2008 | Lokos | A63G 31/12 340/686.6 |
| 2009/0128901 A1 | 5/2009 | Tilleman | |
| 2009/0323737 A1 * | 12/2009 | Ensher | H01S 5/141 372/20 |
| 2010/0079865 A1 | 4/2010 | Saarikko et al. | |
| 2010/0149073 A1 * | 6/2010 | Chaum | G02B 27/0093 345/8 |
| 2010/0157400 A1 * | 6/2010 | Dimov | G02B 5/188 359/13 |
| 2011/0037951 A1 | 2/2011 | Hua et al. | |
| 2011/0109528 A1 | 5/2011 | Mun et al. | |
| 2011/0122305 A1 | 5/2011 | Kobayashi | |
| 2012/0017153 A1 | 1/2012 | Matsuda et al. | |
| 2012/0038918 A1 | 2/2012 | Liu et al. | |
| 2012/0081769 A1 * | 4/2012 | Dergachev | G02B 5/32 359/27 |
| 2012/0120493 A1 | 5/2012 | Simmonds et al. | |
| 2012/0236030 A1 | 9/2012 | Border | |
| 2013/0077049 A1 | 3/2013 | Bohn | |
| 2013/0101253 A1 * | 4/2013 | Popovich | G02B 27/017 385/37 |
| 2013/0222384 A1 * | 8/2013 | Futterer | G02B 5/32 345/426 |
| 2013/0250431 A1 | 9/2013 | Robbins et al. | |
| 2013/0278631 A1 | 10/2013 | Border et al. | |
| 2013/0286178 A1 | 10/2013 | Lewis et al. | |
| 2013/0300637 A1 | 11/2013 | Smits et al. | |
| 2013/0314793 A1 * | 11/2013 | Robbins | G02B 5/18 359/573 |
| 2014/0010265 A1 | 1/2014 | Peng | |
| 2014/0016051 A1 | 1/2014 | Kroll et al. | |
| 2014/0044143 A1 * | 2/2014 | Clarkson | G02B 27/0927 372/72 |
| 2014/0104665 A1 | 4/2014 | Popovich et al. | |
| 2014/0140653 A1 | 5/2014 | Brown et al. | |
| 2014/0140654 A1 * | 5/2014 | Brown | G02B 5/1814 385/10 |
| 2014/0184699 A1 | 7/2014 | Ito et al. | |
| 2014/0204455 A1 | 7/2014 | Popovich et al. | |
| 2014/0211322 A1 | 7/2014 | Bohn et al. | |
| 2014/0361957 A1 | 12/2014 | Hua et al. | |
| 2015/0185475 A1 * | 7/2015 | Saarikko | G02B 6/34 382/117 |
| 2015/0289762 A1 * | 10/2015 | Popovich | G02B 27/0093 351/209 |

FOREIGN PATENT DOCUMENTS

| | | |
|---|---|---|
| JP | 61-213802 | 9/1986 |
| WO | 2007054928 A1 | 5/2007 |
| WO | 2008023367 A1 | 2/2008 |
| WO | 2010057219 A1 | 5/2010 |
| WO | 2013049012 A1 | 4/2013 |
| WO | 2013163347 A1 | 10/2013 |
| WO | 2013167864 A1 | 11/2013 |
| WO | 2013175465 A1 | 11/2013 |

OTHER PUBLICATIONS

Massenot et al., "Multiplexed Holographic Transmission Gratings Recorded in Holographic Polymer-Dispersed Liquid Crystals: Static and Dynamic Studies", Applied Optics, vol. 44, Issue 25, Sep. 2005.

Zharkova et al., "Study of the Dynamics of Transmission Gratings Growth on Holographic Polymer-Dispersed Liquid Crystals", International Conference on Methods of Aerophysical Research, ICMAR, Aug. 2008.

Yan et al., "Multiplexing Holograms in the Photopolymer with Equal Diffraction Efficiency," Advances in Optical Data Storage Technology, Proceedings of SPIE, vol. 5643, (SPIE, Bellingham, WA), Jan. 2005.

Pu et al., "Exposure Schedule for Multiplexing Holograms in Photopolymer Films," Opt. Eng. 35(10), Oct. 1996.

Han et al., "Accurate Diffraction Efficiency Control for Multiplexed Volume Holographic Gratings", Opt. Eng. 41, Nov. 2002.

Minier et al., "Diffraction Characteristics of Superimposed Holographic Gratings in Planar Optical Waveguides", IEEE Photonics Technology Letters, vol. 4, No. 10, Oct. 1992.

Kress et al., "Exit Pupil Expander for Wearable See-Through Displays", Photonic Applications for Aerospace, Transportation, and Harsh Environment III, Proc. of SPIE vol. 8368, 83680D, May 1, 2012.

International Search Report and Written Opinion dated Mar. 18, 2015, in International Patent Application No. PCT/US2014/066999 filed Nov. 24, 2014.

Amendment dated Apr. 7, 2015, in U.S. Appl. No. 14/140,987, filed Dec. 26, 2013.

U.S. Appl. No. 14/495,273, filed Sep. 24, 2014.

U.S. Appl. No. 14/487,404, filed Sep. 16, 2014.

Amendment dated Dec. 3, 2014, in U.S. Appl. No. 14/140,987, filed Dec. 26, 2013.

Iwamoto, Kazuyo, et al., "Eye Movement Tracking Type Image Display System for Wide Image Presentation with High-resolution-Evaluation of High-resolution Image Presentation," Proceedings of the 2002 IEEE/RSJ Intl. Conference on Intelligent Robots and Systems EPFL, Oct. 2002, 6 pages.

(56) References Cited

OTHER PUBLICATIONS

Mukawa et al., "8.4: Distinguished Paper: A Full Color Eyewear Display using Holographic Planar Waveguides", Information Technology Laboratories, Sony Corporation, Tokyo, Japan, May 2008, SID 08 Digest pp. 89-92.

U.S. Appl. No. 14/140,987, filed Dec. 26, 2013.

Office Action dated Feb. 28, 2014, in U.S. Appl. No. 14/140,987, filed Dec. 26, 2013.

Amendment dated May 15, 2014, in U.S. Appl. No. 14/140,987, filed Dec. 26, 2013.

Honig, Zach, "Vuzix Designs Smart Glasses to Look Like Sunshades, Tout Connected Transparent Display", Published on: Jan. 7, 2012, Available at: http://www.engadget.com/2012/01/07/vuzix-smart-glasses-ces-2012/.

International Search Report & Written Opinion dated Oct. 29, 2015, in International Application No. PCT/US2015/044400 filed Aug. 10, 2015.

Office Action dated Jul. 6, 2015, in U.S. Appl. No. 14/140,987, filed Dec. 16, 2013.

Amendment dated Oct. 6, 2015, in U.S. Appl. No. 14/140,987, filed Dec. 16, 2013.

Office Action dated Nov. 19, 2015, in U.S. Appl. No. 14/140,987, filed Dec. 16, 2013.

International Search Report & Written Opinion dated Nov. 26, 2015, in International Application No. PCT/US2015/050066 filed Sep. 15, 2015.

* cited by examiner

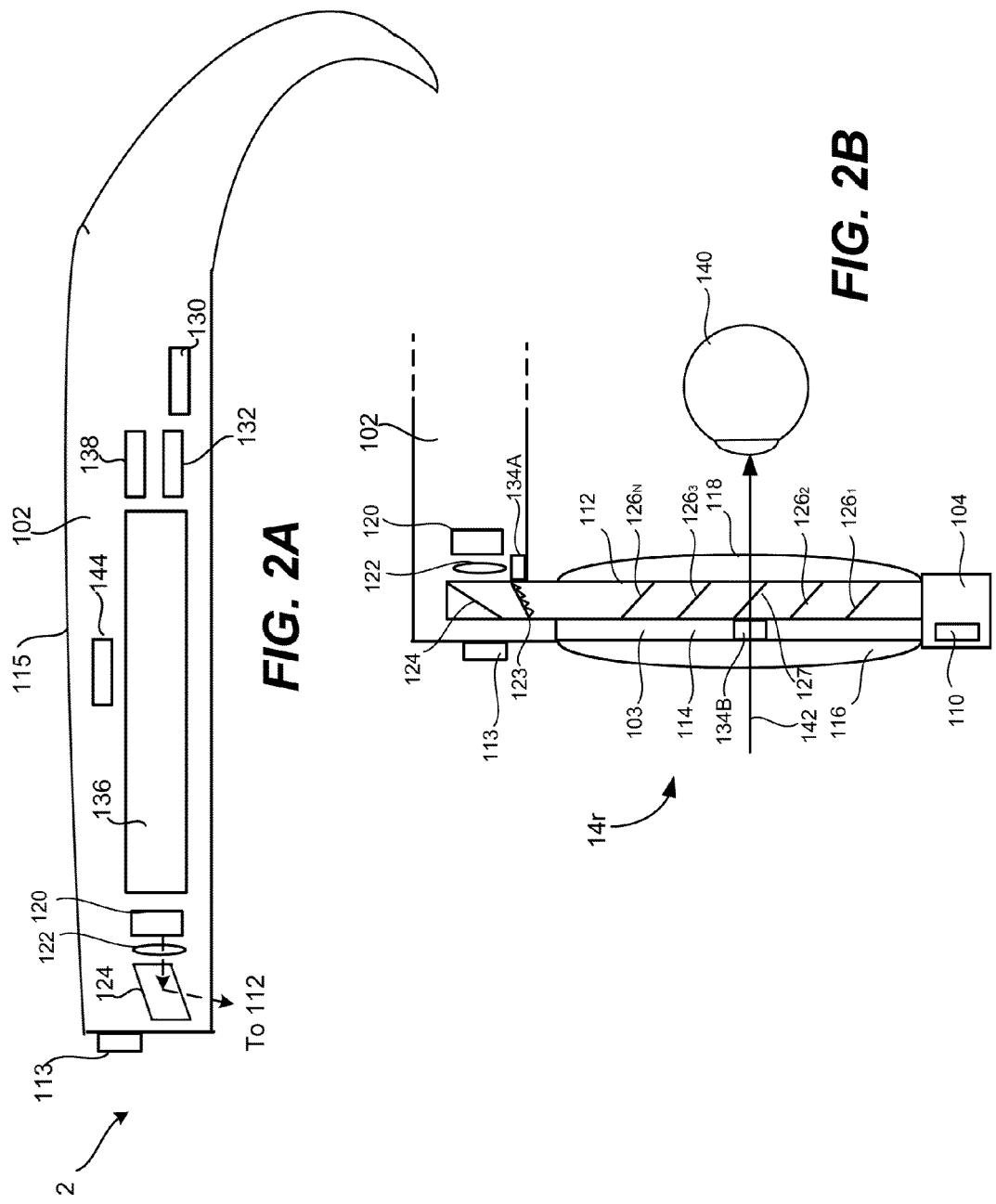

WAVEGUIDE EYE TRACKING EMPLOYING VOLUME BRAGG GRATING

BACKGROUND

A see-through, mixed reality display device system enables a user to observe digital information overlaid on the physical scenery. To enable hands-free user interaction, a see-through, mixed reality display device system may further be equipped with an eye tracker. Typically, an eye tracker includes an infrared (IR) light source to illuminate the user's eye and a sensor (e.g., camera) to image the user's eye, e.g., to observe the reflected glints and iris movements for calculation of a gaze direction. The illumination and the imaging of the eye are preferably implemented such that: the see-through properties of the mixed reality display device system are not impaired by the eye tracking hardware; imaging of the eye works with all types of prescription spectacles; and imaging of the eye covers the entire eye movement range plus an inter-pupillary distance range and an eye relief distance range.

One way to image an eye for eye tracking is using a simple camera mounted on the frame of a head mounted display (HMD) device, wherein the camera is directly focused on the user's eye. In other words, there is a direct line of sight from the camera to the eye. While such a configuration is relatively simple and inexpensive, it is highly sensitive to the position and movement of the camera relative to the eye. Also, with such a configuration the camera needs to be positioned close to the eye level, which typically causes at least partial obstruction of the see-through properties of the mixed reality display device system. Alternatively, a partial reflector may be used to fold the camera view path to the user's temple. While this alternative configuration allows the camera to be positioned outside the see-through field, implementation of this alternative configuration is problematic if the eye tracking needs to work with prescription eyewear.

Another possibility is to use a reverse optical path imaging in a free form prism or other eyepiece based mixed reality display device system. This technique relies on the actual display optics to also provide the imaging functionality for eye tracking. However, because components of a free form prism or eyepiece tend to be rather large in size, this approach is not always practical. Adding a free form optical element for eye tracking only is also possible, but this would be expensive and would add significant weight and size to the system.

SUMMARY

Certain embodiments described herein relate to a waveguide that is for use in tracking an eye that is illuminated by infrared light. Such a waveguide, which can be used in a head mounted display (HMD), but is not limited for use therewith, is transparent and includes an input-coupler and an output-coupler. In accordance with specific embodiments, the input-coupler comprises a volume Bragg grating adapted to receive infrared light having the infrared wavelength and couple the received infrared light into the waveguide. The volume Bragg grating includes a lower boundary and an upper boundary, the upper boundary being closer to the output-coupler than the lower boundary. In accordance with an embodiment, the volume Bragg grating has a k-vector angle at the lower boundary that is greater than a k-vector angle at the upper boundary, with k-vector angles of the volume Bragg grating between the lower and upper boundaries gradually decreasing as distances decrease between grating planes of the volume Bragg grating and the upper boundary. This causes at least a majority of the infrared light that is coupled into the waveguide by the volume Bragg grating type of input-coupler to propagate within the waveguide to the output-coupler of the waveguide.

In accordance with an embodiment, the volume Bragg grating has a Bragg wavelength that is matched to the infrared wavelength of the infrared light for use in eye tracking. Additionally, the volume Bragg grating includes both lens power and prismatic power. The lens power of the volume Bragg grating specifies a focal length of the volume Bragg grating. The prismatic power of the volume Bragg grating causes infrared light that is received by the volume Bragg grating to be coupled into the waveguide.

In accordance with an embodiment, an angular bandwidth of the volume Bragg grating is equal to or less than 5 degrees in the direction of propagation (i.e. perpendicular to the grating lines). More specifically, the angular bandwidth of the volume Bragg grating can be approximately 1.5 degrees in the direction of propagation. This narrow angular bandwidth is used to limit an extent that different infrared light beams, coupled into the waveguide after being reflected from a same point on the eye (at different eye relief distances), can be non-collimated as the different infrared light beams propagate from the volume Bragg grating type of input-coupler to the output-coupler within the waveguide. Accordingly, the use of the narrow angular bandwidth limits that the extent of multiple imaging, which is discussed in additional detail below.

When the input-coupler is positioned in front of an eye that is illuminated with the infrared light, at least a portion of the infrared light reflected from the eye and received by the input-coupler is coupled into the waveguide at the input-coupler, propagates within the waveguide from the input-coupler to the output-coupler by way of total internal reflections, and exits the waveguide at the output-coupler.

In an embodiment, the input-coupler and the output-coupler are positioned relative to one another to substantially achieve telecentricity. Further, to substantially achieve telecentricity an angular bandwidth of each point of the input-coupler is substantially centered on a chief ray of the input-coupler, with all chief rays of the input-coupler being substantially parallel to one another. The output-coupler can be, for example, a linear grating, a holographic grating or a prism, but is not limited thereto.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 2A is a side view of an eyeglass temple of the frame in an embodiment of the see-through, mixed reality display device embodied as eyeglasses providing support for hardware and software components.

FIG. 2B is a top view of an embodiment of an integrated eye tracking and display optical system of a see-through, near-eye, mixed reality device.

DETAILED DESCRIPTION

Certain embodiments of the present technology relate to waveguides that enable imaging of an eye, for the purpose of eye tracking, to be implemented without impairing the see-through properties of a mixed reality display device system. Additionally, such embodiments can advantageously be used with prescription eyewear. Further, such embodiments can be used to perform imaging of the eye that covers the entire eye movement range plus an inter-pupillary distance range and an eye relief distance range. However, before discussing such embodiments in additional detail, it is first useful to describe an exemplary see-through, mixed reality display device system with which embodiments of the present technology can be used.

Figure 1:
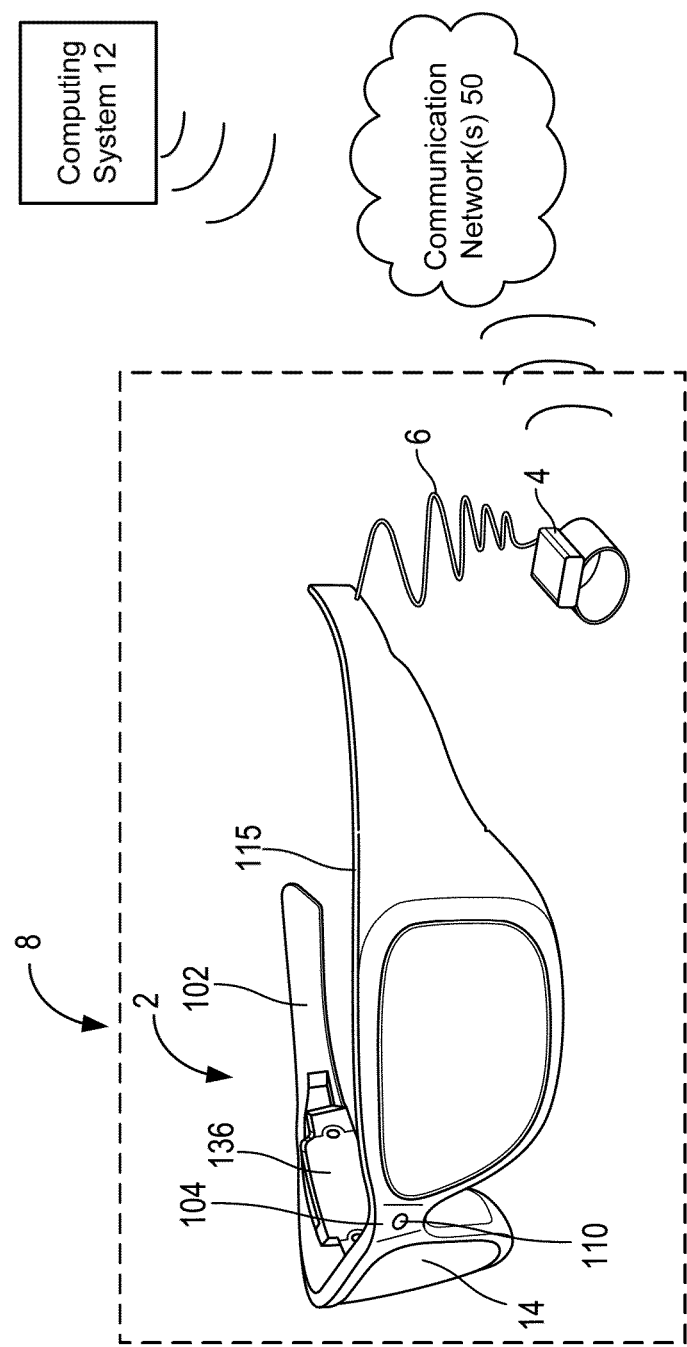
FIG. 1 is a block diagram depicting example components of one embodiment of a see-through, mixed reality display device system.

FIG. 1 is a block diagram depicting example components of one embodiment of a see-through, mixed reality display device system. System 8 includes a see-through display device as a near-eye, head mounted display device 2 in communication with processing unit 4 via wire 6. In other embodiments, head mounted display device 2 communicates with processing unit 4 via wireless communication. Processing unit 4 may take various embodiments. For example, processing unit 4 may be embodied in a mobile device like a smart phone, tablet or laptop computer. In some embodiments, processing unit 4 is a separate unit which may be worn on the user's body, e.g. the wrist in the illustrated example or in a pocket, and includes much of the computing power used to operate near-eye display device 2. Processing unit 4 may communicate wirelessly (e.g., WiFi, Bluetooth, infrared, RFID transmission, wireless Universal Serial Bus (WUSB), cellular, 3G, 4G or other wireless communication means) over a communication network 50 to one or more hub computing systems 12 whether located nearby in this example or at a remote location. In other embodiments, the functionality of the processing unit 4 may be integrated in software and hardware components of the display device 2.

Head mounted display device 2, which in one embodiment is in the shape of eyeglasses in a frame 115, is worn on the head of a user so that the user can see through a display, embodied in this example as a display optical system 14 for each eye, and thereby have an actual direct view of the space in front of the user.

The use of the term "actual direct view" refers to the ability to see real world objects directly with the human eye, rather than seeing created image representations of the objects. For example, looking through glass at a room allows a user to have an actual direct view of the room, while viewing a video of a room on a television is not an actual direct view of the room. Based on the context of executing software, for example, a gaming application, the system can project images of virtual objects, sometimes referred to as virtual images, on the display that are viewable by the person wearing the see-through display device while that person is also viewing real world objects through the display.

Frame 115 provides a support for holding elements of the system in place as well as a conduit for electrical connections. In this embodiment, frame 115 provides a convenient eyeglass frame as support for the elements of the system discussed further below. In other embodiments, other support structures can be used. An example of such a structure is a visor or goggles. The frame 115 includes a temple or side arm for resting on each of a user's ears. Temple 102 is representative of an embodiment of the right temple and includes control circuitry 136 for the display device 2. Nose bridge 104 of the frame 115 includes a microphone 110 for recording sounds and transmitting audio data to processing unit 4.

FIG. 2A is a side view of an eyeglass temple 102 of the frame 115 in an embodiment of the see-through, mixed reality display device embodied as eyeglasses providing support for hardware and software components. At the front of frame 115 is physical environment facing or outward facing video camera 113 that can capture video and still images which are transmitted to the processing unit 4.

The data from the camera may be sent to a processor 210 of the control circuitry 136, or the processing unit 4 or both, which may process them but which the unit 4 may also send to one or more computer systems 12 over a network 50 for processing. The processing identifies and maps the user's real world field of view.

Control circuits 136 provide various electronics that support the other components of head mounted display device 2. More details of control circuits 136 are provided below with respect to FIG. 3A. Inside, or mounted to the temple 102, are ear phones 130, inertial sensors 132, GPS transceiver 144 and temperature sensor 138. In one embodiment, inertial sensors 132 include a three axis magnetometer 132A, three axis gyro 132B and three axis accelerometer 132C (See FIG. 3A). The inertial sensors are for sensing position, orientation, and sudden accelerations of head mounted display device 2. From these movements, head position may also be determined.

Mounted to or inside the temple 102 is an image source or image generation unit 120. In one embodiment, the image source includes micro display 120 for projecting images of one or more virtual objects and lens system 122 for directing images from micro display 120 into a see-through waveguide 112. Lens system 122 may include one or more lenses. In one embodiment, lens system 122 includes one or more collimating lenses. In the illustrated example, a reflecting element 124 receives the images directed by the lens system 122 and optically couples the image data into the waveguide 112.

There are different image generation technologies that can be used to implement micro display 120. For example, micro display 120 can be implemented using a transmissive projection technology where the light source is modulated by optically active material, backlit with white light. These technologies are usually implemented using LCD type displays with powerful backlights and high optical energy densities. Micro display 120 can also be implemented using a reflective technology for which external light is reflected and modulated by an optically active material. Digital light processing (DLP), liquid crystal on silicon (LCOS) and Mirasol® display technology from Qualcomm, Inc. are all examples of reflective technologies. Additionally, micro display 120 can be implemented using an emissive technology where light is generated by the display, see for example, a PicoP™ display engine from Microvision, Inc. Another example of emissive display technology is a micro organic light emitting diode (OLED) display. Companies eMagin and Microoled provide examples of micro OLED displays.

FIG. 2B is a top view of an embodiment of a display optical system 14 of a see-through, near-eye, augmented or mixed reality device. A portion of the frame 115 of the near-eye display device 2 will surround a display optical system 14 for providing support for one or more optical elements as illustrated here and in the following figures and for making electrical connections. In order to show the components of the display optical system 14, in this case 14r for the right eye system, in the head mounted display device 2, a portion of the frame 115 surrounding the display optical system is not depicted.

In one embodiment, the display optical system 14 includes a waveguide 112, an optional opacity filter 114, see-through lens 116 and see-through lens 118. In one embodiment, opacity filter 114 is behind and aligned with see-through lens 116, waveguide 112 is behind and aligned with opacity filter 114, and see-through lens 118 is behind and aligned with waveguide 112. See-through lenses 116 and 118 may be standard lenses used in eye glasses and can be made to any prescription (including no prescription). In some embodiments, head mounted display device 2 will include only one see-through lens or no see-through lenses. Opacity filter 114, which is aligned with waveguide 112, selectively blocks natural light, either uniformly or on a per-pixel basis, from passing through waveguide 112. For example, the opacity filter enhances the contrast of the virtual imagery.

The waveguide 112 transmits visible light from micro display 120 to the eye 140 of the user wearing head mounted display device 2. The see-through waveguide 112 also allows visible light from in front of the head mounted display device 2 to be transmitted through itself 112 to eye 140, as depicted by arrow 142 representing an optical axis of the display optical system 14r, thereby allowing the user to have an actual direct view of the space in front of head mounted display device 2 in addition to receiving a virtual image from the micro display 120. Thus, the walls of waveguide 112 are see-through waveguide 112 includes a first reflecting surface (e.g., a mirror or other surface) or a first diffractive grating 124. Visible light from micro display 120 passes through lens 122 and becomes incident on reflecting surface or diffractive grating 124. The reflecting surface or the diffractive grating 124 reflects or diffracts the incident visible light from the micro display 120 such that visible light is trapped inside a substrate comprising waveguide 112 by internal reflection as described further below.

Infrared illumination and reflections also traverse the waveguide 112 for an eye tracking system 134 for tracking the position and gaze direction of the user's eyes. A user's eyes will be directed at a subset of the environment which is the user's area of focus or gaze. The eye tracking system 134 comprises an eye tracking illumination source 134A, which in this example is mounted to or inside the temple 102, and an eye tracking IR sensor 134B, which is this example is mounted to or inside a brow 103 of the frame 115. The eye tracking IR sensor 134B can alternatively be positioned between lens 118 and the temple 102. It is also possible that both the eye tracking illumination source 134A and the eye tracking IR sensor 134B are mounted to or inside the brow 103 of the frame 115.

The technology allows flexibility in the placement of entry and exit optical couplings (which can also be referred to as input- and output-couplers) to and from the waveguide's optical path for the image generation unit 120, the illumination source 134A and the eye tracking IR sensor 134B. The visible illumination representing images and the infrared illumination may enter from any direction about the waveguide 112, and one or more wavelength selective filters (e.g. 127) direct the illumination out of the waveguide centered about the optical axis 142 of the display optical system 14.

In one embodiment, the eye tracking illumination source 134A may include one or more infrared (IR) emitters such as an infrared light emitting diode (LED) or a laser (e.g. VCSEL) emitting about a predetermined IR wavelength or a range of wavelengths. In some embodiments, the eye tracking IR sensor 134B may be an IR camera or an IR position sensitive detector (PSD) for tracking glint positions.

In an embodiment, a wavelength selective filter 123 passes through visible spectrum light from the micro display 120 via reflecting surface 124 and directs the infrared wavelength illumination from the eye tracking illumination source 134A into the waveguide 112 where the IR illumination is internally reflected within the waveguide until reaching another wavelength selective filter 127 aligned with the optical axis 142.

From the IR reflections, the position of the pupil within the eye socket can be identified by known imaging techniques when the eye tracking IR sensor 134B is an IR camera, and by glint position data when the eye tracking IR sensor 134B is a type of position sensitive detector (PSD). The use of other types of eye tracking IR sensors and other techniques for eye tracking are also possible and within the scope of an embodiment.

After coupling into the waveguide 112, the visible illumination representing the image data from the micro display 120 and the IR illumination are internally reflected within the waveguide 112. In the example of FIG. 2B, after several reflections off the surfaces of the substrate, the trapped visible light waves reach an array of wavelength selective filters embodied in this example as selectively reflecting surfaces $126_1$ to $126_N$. Additionally, a wavelength selective filter 127 aligned with the optical axis of the display optical system is also positioned in the waveguide 112. Reflecting surfaces 126 couple visible light wavelengths incident upon those reflecting surfaces out of the substrate directed in the direction of the eye 140 of the user.

The reflecting surfaces 126 also pass infrared radiation within the waveguide. However, aligned with the optical axis 142 of the display optical system 14r, is one or more wavelength selective filters 127 which direct not only visible illumination but received infrared illumination from the illumination source 134A. For example, if the reflecting elements $126_1$ to $126_N$ are each reflecting different portions of the visible spectrum, the one or more wavelength selective filters 127 may reflect wavelengths in the red visible spectrum and the infrared spectrum. In other embodiments, the filters 127 can reflect wavelengths covering the entire visible spectrum or a larger portion thereof and the infrared spectrum for wavelengths of IR reflections and those generated by the IR illumination source.

Additionally, as will be discussed in more detail below with reference FIGS. 4A and 4B an input-coupler (not specifically shown in FIGS. 2A and 2B, but shown in FIGS. 4A and 4B) directs infrared reflections from the eye which pass through the see-through walls of the waveguide centered about the optical axis 142 into an optical path of the waveguide in a direction towards an output-coupler (not specifically shown in FIGS. 2A and 2B, but shown in FIGS. 4A-5C) that directs infrared light towards the eye tracking IR sensor 134B. Additionally, visible and infrared filters may be stacked in the direction from lens 116 to 118 so that they are all co-axial with the optical axis. For example, a bidirectional hot mirror placed in front of a visible reflecting element with respect to the eye lets visible light pass but reflects IR wavelengths. Additionally, the one or more filters 127 may be embodied as an active grating which is modulated between filtering wavelengths in the visible and infrared spectrums. This would be done at a rate fast enough for the human eye not to detect.

In an embodiment, each eye will have its own waveguide 112. When the head mounted display device has two waveguides, each eye can have its own micro display 120 that can display the same image in both eyes or different images in the two eyes. Further, when the head mounted display device has two waveguides, each eye can have its own eye tracking illumination source 134A and its own eye tracking IR sensor 134B. In another embodiment, there can be one waveguide with two optical axes, one for each eye, which spans the nose bridge and reflects visible and infrared light into both eyes.

In the embodiments described above, the specific number of lenses shown are just examples. Other numbers and configurations of lenses operating on the same principles may be used. Additionally, FIGS. 2A and 2B only show half of the head mounted display device 2. A full head mounted display device would include, for example, another set of see through lenses 116 and 118, another opacity filter 114, another waveguide 112 with one or more wavelength selective filters 127, another micro display 120, another lens system 122 physical environment facing camera 113 (also referred to as outward facing or front facing camera 113), eye tracking assembly 134, earphone 130, filter 123 and temperature sensor 138. Additional details of an exemplary head mounted display 2 are provided in United States Patent Application Publication No. 2012/0092328, entitled "Fusing Virtual Content Into Real Content," filed Oct. 15, 2010, by Flaks et al.

Figure 3A:
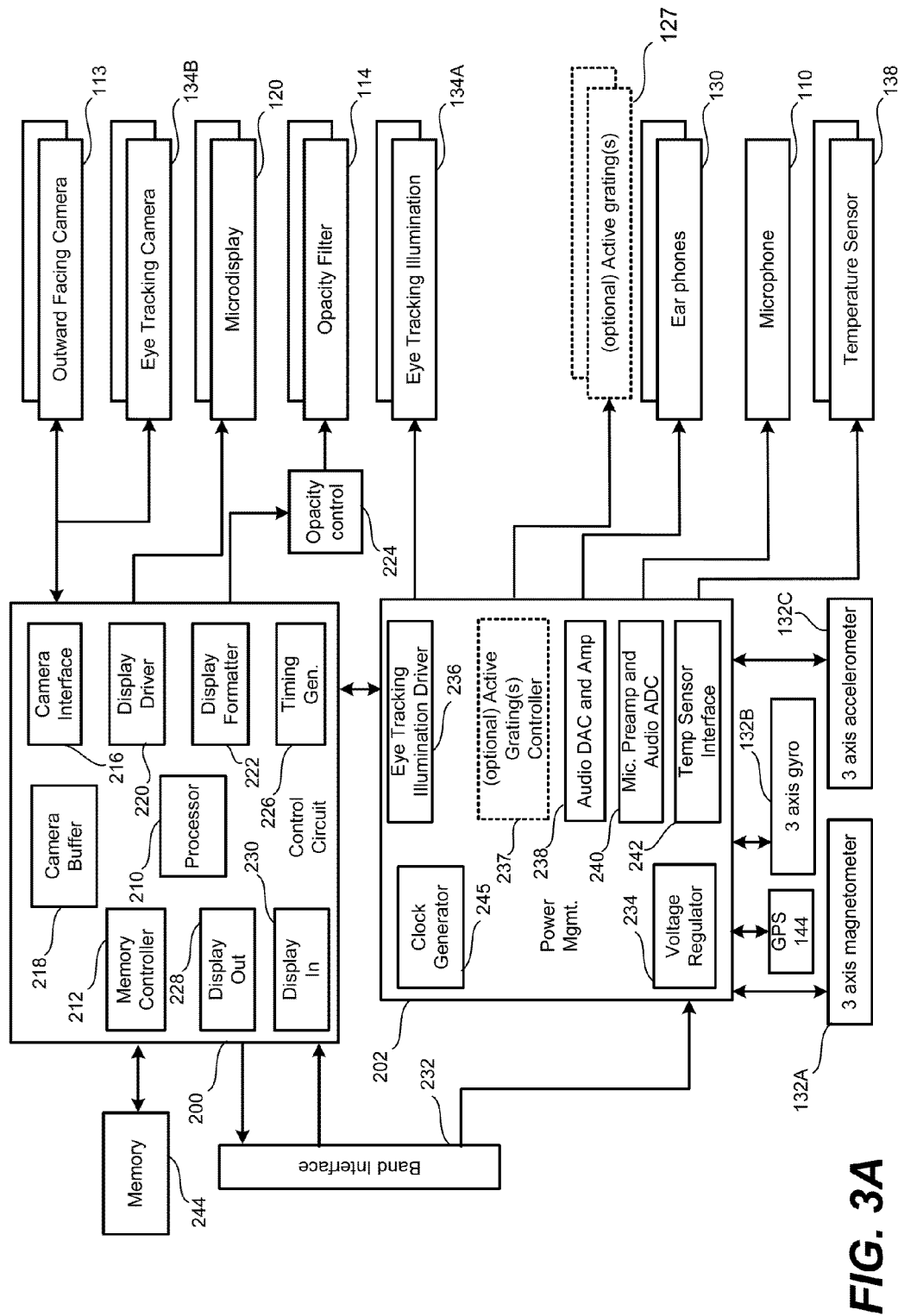
FIG. 3A is a block diagram of one embodiment of hardware and software components of a see-through, near-eye, mixed reality display device as may be used with one or more embodiments.
Figure 3B:
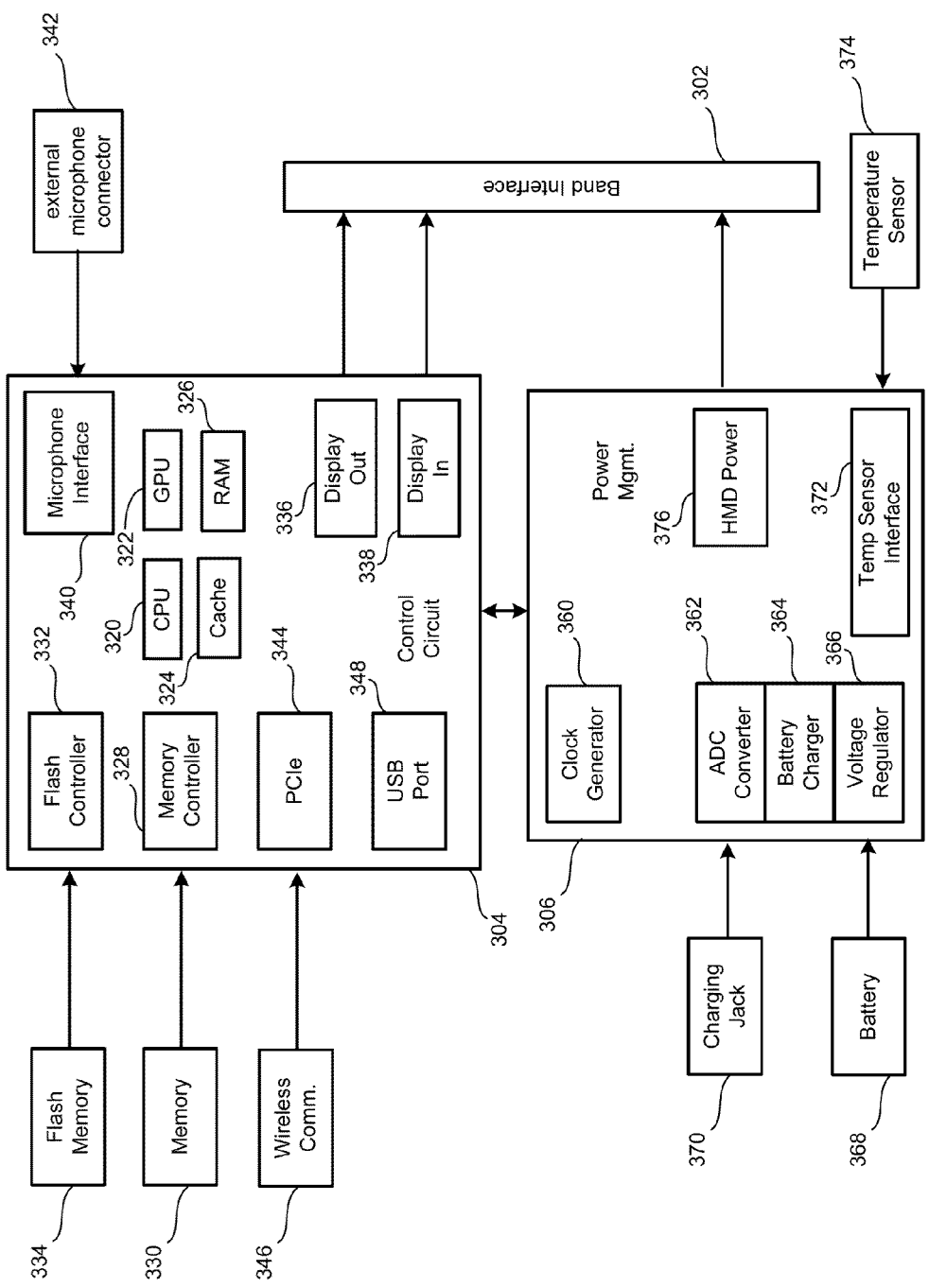
FIG. 3B is a block diagram describing the various components of a processing unit.

FIG. 3A is a block diagram of one embodiment of hardware and software components of a see-through, near-eye, mixed reality display device 2 as may be used with one or more embodiments. FIG. 3B is a block diagram describing the various components of a processing unit 4. In this embodiment, near-eye display device 2, receives instructions about a virtual image from processing unit 4 and provides data from sensors back to processing unit 4. Software and hardware components which may be embodied in a processing unit 4, for example as depicted in FIG. 3B, receive the sensory data from the display device 2 and may also receive sensory information from a computing system 12 over a network 50. Based on that information, processing unit 4 will determine where and when to provide a virtual image to the user and send instructions accordingly to the control circuitry 136 of the display device 2.

Note that some of the components of FIG. 3A (e.g., outward or physical environment facing camera 113, eye camera 134, micro display 120, opacity filter 114, eye tracking illumination unit 134A, earphones 130, one or more wavelength selective filters 127, and temperature sensor 138) are shown in shadow to indicate that there can be at least two of each of those devices, at least one for the left side and at least one for the right side of head mounted display device 2. FIG. 3A shows the control circuit 200 in communication with the power management circuit 202. Control circuit 200 includes processor 210, memory controller 212 in communication with memory 244 (e.g., D-RAM), camera interface 216, camera buffer 218, display driver 220, display formatter 222, timing generator 226, display out interface 228, and display in interface 230. In one embodiment, all of components of control circuit 200 are in communication with each other via dedicated lines of one or more buses. In another embodiment, each of the components of control circuit 200 is in communication with processor 210.

Camera interface 216 provides an interface to the two physical environment facing cameras 113 and, in this embodiment, an IR camera as sensor 134B and stores respective images received from the cameras 113, 134B in camera buffer 218. Display driver 220 will drive microdisplay 120. Display formatter 222 may provide information, about the virtual image being displayed on microdisplay 120 to one or more processors of one or more computer systems, e.g. 4 and 12 performing processing for the mixed reality system. The display formatter 222 can identify to the opacity control unit 224 transmissivity settings with respect to the display optical system 14. Timing generator 226 is used to provide timing data for the system. Display out interface 228 includes a buffer for providing images from physical environment facing cameras 113 and the eye cameras 134B to the processing unit 4. Display in interface 230 includes a buffer for receiving images such as a virtual image to be displayed on microdisplay 120. Display out 228 and display in 230 communicate with band interface 232 which is an interface to processing unit 4.

Power management circuit 202 includes voltage regulator 234, eye tracking illumination driver 236, audio DAC and amplifier 238, microphone preamplifier and audio ADC 240, temperature sensor interface 242, active filter controller 237, and clock generator 245. Voltage regulator 234 receives power from processing unit 4 via band interface 232 and provides that power to the other components of head mounted display device 2. Illumination driver 236 controls, for example via a drive current or voltage, the eye tracking illumination unit 134A to operate about a predetermined wavelength or within a wavelength range. Audio DAC and amplifier 238 provides audio data to earphones 130. Microphone preamplifier and audio ADC 240 provides an interface for microphone 110. Temperature sensor interface 242 is an interface for temperature sensor 138. Active filter controller 237 receives data indicating one or more wavelengths for which each wavelength selective filter 127 is to act as a selective wavelength filter. Power management unit 202 also provides power and receives data back from three axis magnetometer 132A, three axis gyroscope 132B and three axis accelerometer 132C. Power management unit 202 also provides power and receives data back from and sends data to GPS transceiver 144.

FIG. 3B is a block diagram of one embodiment of the hardware and software components of a processing unit 4 associated with a see-through, near-eye, mixed reality display unit. FIG. 3B shows controls circuit 304 in communication with power management circuit 306. Control circuit 304 includes a central processing unit (CPU) 320, graphics processing unit (GPU) 322, cache 324, RAM 326, memory control 328 in communication with memory 330 (e.g., D-RAM), flash memory controller 332 in communication with flash memory 334 (or other type of non-volatile storage), display out buffer 336 in communication with see-through, near-eye display device 2 via band interface 302 and band interface 232, display in buffer 338 in communication with near-eye display device 2 via band interface 302 and band interface 232, microphone interface 340 in communication with an external microphone connector 342 for connecting to a microphone, PCI express interface for connecting to a wireless communication device 346, and USB port(s) 348.

In one embodiment, wireless communication component 346 can include a Wi-Fi enabled communication device, Bluetooth communication device, infrared communication device, cellular, 3G, 4G communication devices, wireless USB (WUSB) communication device, RFID communication device etc. The wireless communication component 346 thus allows peer-to-peer data transfers with for example, another display device system 8, as well as connection to a larger network via a wireless router or cell tower. The USB port can be used to dock the processing unit 4 to another display device system 8. Additionally, the processing unit 4 can dock to another computing system 12 in order to load data or software onto processing unit 4 as well as charge the processing unit 4. In one embodiment, CPU 320 and GPU 322 are the main workhorses for determining where, when and how to insert virtual images into the view of the user.

Power management circuit 306 includes clock generator 360, analog to digital converter 362, battery charger 364, voltage regulator 366, see-through, near-eye display power source 376, and temperature sensor interface 372 in communication with temperature sensor 374 (located on the wrist band of processing unit 4). An alternating current to direct current converter 362 is connected to a charging jack 370 for receiving an AC supply and creating a DC supply for the system. Voltage regulator 366 is in communication with battery 368 for supplying power to the system. Battery charger 364 is used to charge battery 368 (via voltage regulator 366) upon receiving power from charging jack 370. Device power interface 376 provides power to the display device 2.

Waveguide Eye Tracking System

Figure 4A:
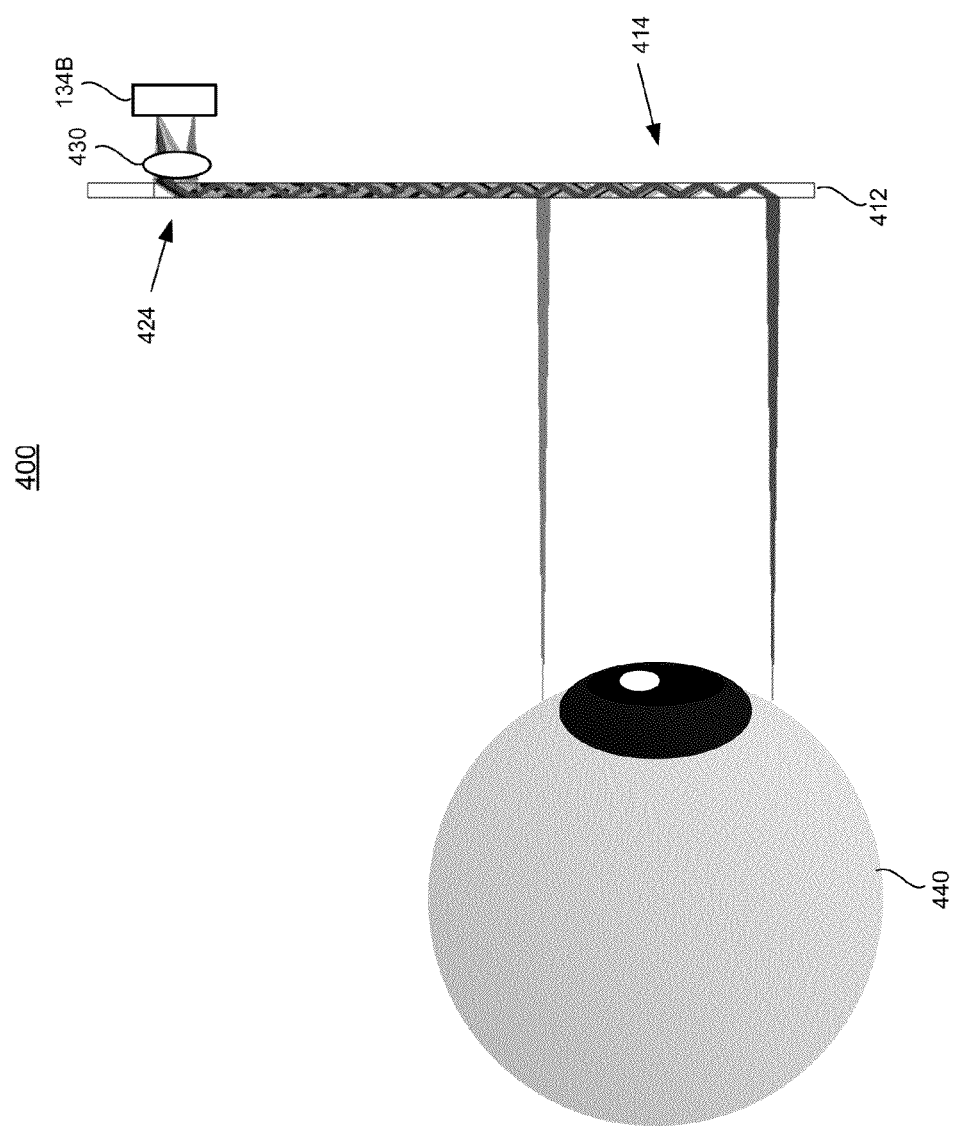
FIG. 4A illustrates a side view of a portion of an eye tracking system including a waveguide according to an embodiment.
Figure 4B:
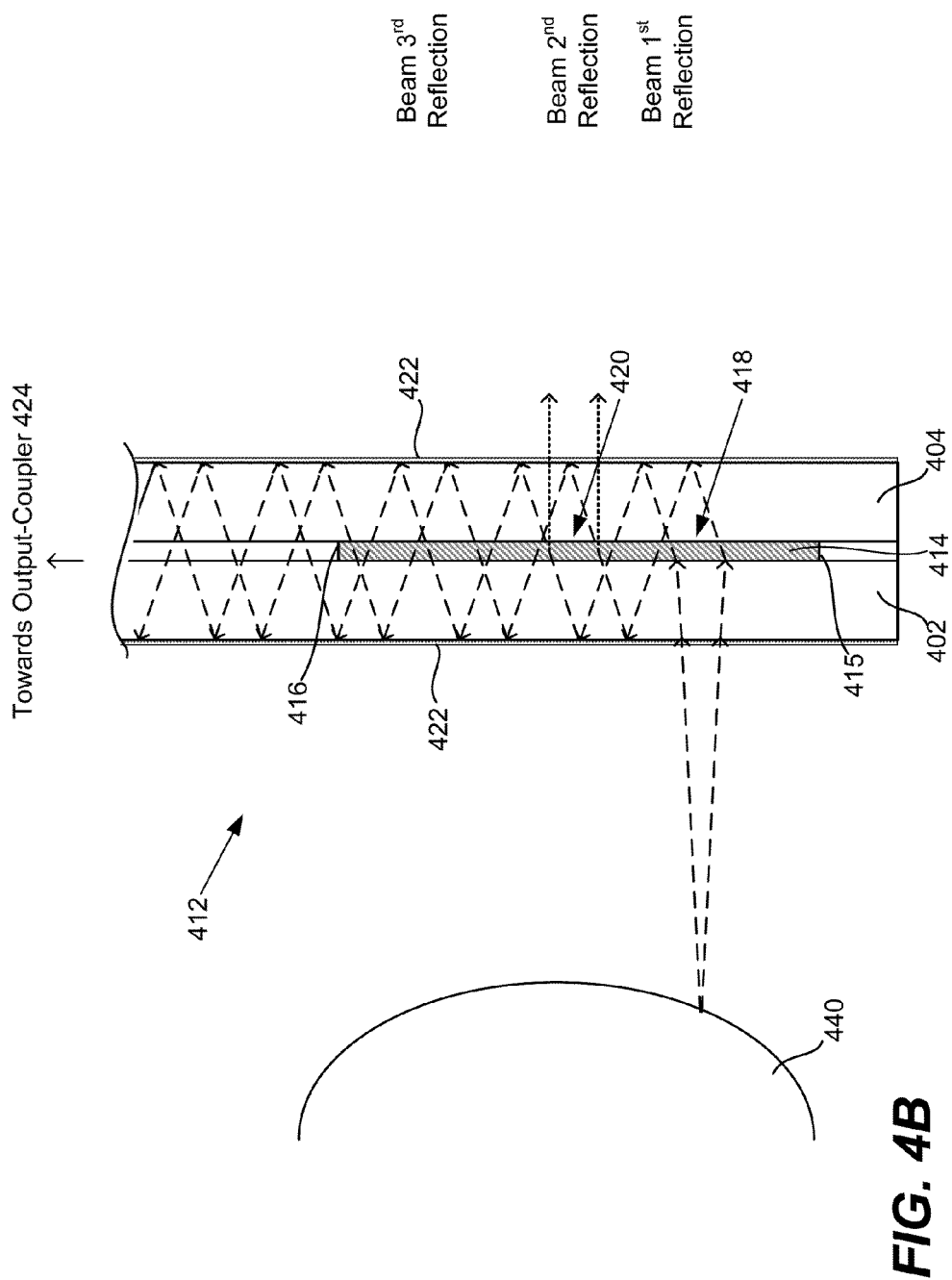
FIG. 4B is a blow up of the portion of the waveguide introduced in FIG. 4A.

FIGS. 4A and 4B will now be used to describe specific features of a waveguide 412, according to an embodiment of the present technology. More specifically, FIGS. 4A and 4B will be used to describe portions of the waveguide 412 that are used to collect infrared light reflected from an eye 440 and provide the infrared light to an eye tracking IR sensor (e.g., 134B discussed above with reference to FIGS. 2B and 3A) for use in eye tracking. Accordingly, the waveguide 412 can also be referred to as an eye tracker waveguide 412 or an eye tracking waveguide 412. More generally, the waveguide can be referred to as an apparatus for use in tracking an eye.

The waveguide 412 can be incorporated into a see-through mixed reality display device system, such as the one described above with reference to FIGS. 1-3B, but is not limited to user therewith. For example, the waveguide 412 can be used to implement the waveguide 112 (or a portion thereof) discussed above with reference to FIGS. 1, 2A and 2B. Alternatively, the waveguide 412 can be located adjacent to the waveguide 112 or used in place of the waveguide 112, depending upon implementation. A separate instance of the waveguide 412 can be provided for each of the left and right eyes of a user whose eyes are being tracked. If used in the see-through mixed reality display device system described above with reference to FIGS. 1-3B, the waveguide 412 may be positioned next to or between see-through lenses (e.g., 116 and/or 118), which may be standard lenses used in eye glasses and can be made to any prescription (including no prescription). The waveguide 412 can alternatively be used with any system that is intended to perform eye tracking based on infrared light reflected from an eye.

FIG. 4A illustrates a side view of a portion of an eye tracking system 400 including the waveguide 412, and thus, the portion of the eye tracking system shown in FIG. 4A can be referred to as a waveguide eye tracker 400. The waveguide 412 includes an input-coupler 414 and an output-coupler 424. Also shown in FIG. 4A is a lens module 430, including one or more lenses, that is configured to convert the angular space of the rays within the waveguide 412 to two-dimensional (2D) space after the rays exit the waveguide 412 proximate the output-coupler 424. Explained another way, the lens module 430, which can also be referred to as the imaging lens 430, is used to convert angular encoded infrared light beams into two-dimensional (2D) spatially encoded infrared light beams. After being converted to two-dimensional space, the infrared light beams are incident on a two-dimensional plane of the eye tracking IR sensor 134B, as shown in FIG. 4A. The eye tracking IR sensor 134B produces eye tracking data in dependence on the two-dimensional spatially encoded infrared light beams that are incident on the sensor.

In general, the input-coupler 414 of the waveguide is preferably axially aligned with an eye 440, such that when the eye 440 is illuminated with infrared light, infrared light beams reflected from the eye will be incident on the input-coupler 414 of the waveguide 412. More generally, infrared light will be reflected from the eye 440, e.g., when the eye 440 is illuminated by infrared light produced by the eye tracking illumination unit 134A, as explained above.

The output-coupler 424 is preferably located in close proximity to the sensor or camera (e.g., eye tracking IR sensor 134B) that is used to image the eye. As was mentioned above, such a sensor or camera can be mounted to or inside the brow (e.g., 103) of a frame (e.g., 115). Alternatively, a sensor or camera can be mounted to or inside the temple or side arm (e.g., 102) of a frame, in which case, the relative positions of the input-coupler 414 and the output-coupler 424 may be rotated by ninety degrees. As was explained above, a lens module (e.g., 430) can be located between the output-coupler 424 and the sensor (e.g., eye tracking IR sensor 134B). In accordance with an embodiment, the output coupler incorporates lens power that partially or totally replaces the lens module 430. For example, in one embodiment the output-coupler 424 provides wedge power and lens power in a single diffraction optical element.

In accordance with an embodiment, the horizontal-by-vertical area of the input-coupler is 28 mm×16 mm, which defines the eye tracking area. Alternative areas are also possible and within the scope of an embodiment. The aperture of the output-coupler can be, e.g., 3.7 mm, but smaller or larger apertures are also possible and within the scope of an embodiment. The f-number of the lens module 430 can be, e.g., 1.35, but smaller or larger f-numbers are also possible and within the scope of an embodiment. The thickness of the waveguide 412 is preferably 1 mm or less, but greater thicknesses are possible and within the scope of an embodiment. The waveguide 412 can be manufactured using BK7 optical glass, but the use of other optical materials are also possible and within the scope of an embodiment. Assuming the wavelength of the infrared light used for eye tracking is 850 nm, the waveguide 412 preferably provides for total internal reflections for an angle of incidence (AOI) greater than 42 degrees at 850 nm. It is also within the scope of an embodiment that alternative infrared wavelengths can be used. To achieve total internal reflections below the critical angle of the substrate, a reflective coating 422 can be applied to outer surfaces of the waveguide 412 at the air-glass interface. This coating is useful in embodiments where the range of internal angles generated by the input coupler is greater than what can be supported by the substrate. For example, if the eye tracking area is 28 mm×16 mm and the eye relief (distance from the eye to the input coupler) is around 20 mm, if the region of the input coupler nearest the imaging lens generates an internal angle just above the critical angle of BK7, then the internal angles generated by the region of the input coupler furthest away from the imaging lens would need to be above 90 degrees which is essentially impossible. Alternatively, if the input coupler was designed to generate internal angles of around 70 degrees for the region of the input coupler furthest from the imaging lens then the internal angles generated by the region of the input coupler nearest the imaging lens would be less than the critical angle of BK7, thus requiring a coating to extend the internal reflection.

FIG. 4B, which is a blow up of the portion of the waveguide 412 that includes the input-coupler 414, will now be used to described additional details of the waveguide 412, according to an embodiment. Referring to FIG. 4B, the waveguide 412 is shown as including a first transparent layer 402, a second transparent layer 404, and the input-coupler 414. Although not specifically shown in FIG. 4B, the output-coupler 424 can be similarly between the first and second transparent layers 402, 404. The transparent layers 402, 404 can be made of glass or optical plastic, but are not limited thereto. It is noted that even if the transparent layers 402, 404 are made of optical plastic, the interface between such layers and air will still be referred to as an air-glass interface. As shown in FIG. 4B, the input-coupler 414 has a lower boundary 415 and an upper boundary 416, with the upper boundary 416 being closer to the output-coupler 424 than the lower boundary 415.

The input-coupler 414, which is a diffractive element, is configured to have an angle of refraction that is different than the angle of incidence. More specifically, the diffractive element input-coupler 414 adjusts the angle of light passing through the first transparent layer 402 so that the angle of the light as it meets the second transparent layer 404 is beyond the critical angle and thus reflects internally in the waveguide 412. The light will then pass out of the waveguide 412 at the output-coupler 424, as mentioned above. In accordance with specific embodiments, described below, the diffractive element input-coupler 414 is a volume Bragg grating type of input-coupler.

When the input-coupler 414 is positioned in front of an eye 440 that is illuminated with infrared light, infrared light beams (one example of which is shown by dashed arrows in FIG. 4B) reflected from the eye 440 pass through the first transparent layer 402 and are incident on the input-coupler 414. These infrared light beams enter the waveguide 412 at the input-coupler 414, propagate within the waveguide 412 from the input-coupler 414 to the output-coupler 424 by way of total internal reflections, and exit the waveguide 412 proximate the output-coupler 424. Explained another way, infrared light reflected from the eye 440 is imaged by the input-coupler 414 and simultaneously diffracted into waveguide mode by diffracting the infrared light so that the diffracted infrared light is incident on surfaces of the waveguide 412 at a greater angle than the critical angle for total internal reflection.

The input-coupler 414 can be implemented as an input-grating, in which case the input-coupler 414 can simply be referred to as an input-grating 414. In certain embodiments, described in addition detail below, the input-coupler 414 is a volume Bragg grating type of input-grating, in which case the input-coupler 414 can be referred to as a volume Bragg grating type of input-coupler 414, a volume Bragg grating type of input-grating 414, or simply as a volume Bragg grating 414. The output-coupler 424, which can be reflective, diffractive or refractive, or a combination thereof, can be implanted, e.g., as a linear grating type of output-coupler, a holographic grating type of output-coupler, a prism or another optical coupler capable of causing infrared light to exit the waveguide 412. The output-coupler 414 can additionally have lens power integrated in the prescription which could replace some or all of the lens power of the lens module 430. In one such embodiment, the output-coupler 414 can be a volume Bragg Grating with wedge and lens power. The lens power of the output-coupler 414 could provide some or all of the lens power of the lens module 430. In one embodiment, the output-coupler 414 provides a small correction to the lens module 430, for example by providing aspheric correction. Referring briefly back to FIG. 4A, the purpose of the output-coupler 424 is to cause infrared light to exit the waveguide 412 toward the lens module 430 and/or towards the eye tracking IR sensor 134B. The infrared light is then finally imaged by the lens module 430 (or the output-coupler itself) onto the eye tracking IR sensor 134B. The eye tracking IR sensor can be, e.g., a charge-coupled device (CCD) or CMOS two-dimensional (2D) pixel sensor array, but is not limited thereto.

In an embodiment, the volume Bragg grating type of input-coupler 414 and the output-coupler 424 are positioned relative to one another to achieve telecentricity. Under this circumstance, the entrance pupil is located at infinity, which makes the input-coupler object-space telecentric. This can advantageously provide an orthographic projection of the eye 440. Telecentricity can also be achieved by designing the angular bandwidth of the input-coupler so that it centers on light which is parallel for all light from the eye plane. This does not necessarily mean that the angular bandwidth centers on light which is orthogonal to the waveguide. For example, it may be advantageous to view the eye plane from a direction below the eye plane (looking up at the eye) to reduce obscuration due to eye lashes. Explained another way, to achieve telecentricity in object space the angular bandwidth of each point of the input-coupler 414 should be centered on a chief ray where all chief rays of the input-coupler 414 are substantially parallel.

In accordance with an embodiment, the volume Bragg grating type of input-coupler 414 has a lens power and a wedge power. The lens power of the volume Bragg grating type of input-coupler 414 preferably has a focal length that is equal to a distance between the eye 440 and the volume Bragg grating type of input-coupler 414, which advantageously causes infrared light (reflected from the eye 440, and incident on the volume Bragg grating type of input-coupler 414) to be collimated within the waveguide 412. For example, if the distance between the eye 440 and the volume Bragg grating type of input-coupler 414 is 20 millimeters (mm), then the focal length of the lens power of the input-grating is preferably 20 mm. The wedge power, which can also be referred to as wedge diffractive power or prismatic power, diffracts the infrared light (which is preferably collimated) into waveguide mode. The wedge power is preferably selected so that the infrared light incident on a portion of the volume Bragg grating type of input-coupler 414 near its upper boundary 416 is diffracted internally so that the angle of incidence to the air-glass interface of the waveguide is greater than the total internal reflection (TIR) angle of the waveguide 412 (and the therefore guided by the waveguide 412). In addition the wedge power is preferably selected so that infrared light incident on a portion of the volume Bragg grating type of input-coupler 414 near its lower boundary 415 is diffracted internally so that the angle of incidence to the air-glass interface of the waveguide is not too large (e.g., no greater than 70 degrees) to avoid rays travelling almost parallel to surfaces of the waveguide 412. In accordance with an embodiment, the lens power and the wedge power are combined mathematically and implemented by a single Bragg grating prescription. This can be achieved by mathematically fitting a phase polynomial that satisfies the conditions of input angles to output angles across a surface of the grating. The generating of a phase polynomial of this type can be used to program an electron beam etching machine to produce a surface grating in a medium, such as chrome or glass. This in turn can be used to generate a phase copy master hologram, which in turn can be used in a contact copy process to mass produce the volume Bragg grating type of input-coupler 414.

Beams reflected within the waveguide 412 are close together, with the distance between such beams being dependent on an angle of propagation within the waveguide 412, the thickness of the waveguide 412, and the beam width. Since there is a desire to make the thickness of the waveguide 412 as thin as practical, different beams within the waveguide 412 may be very close to one another and potentially overlap one another.

The eye tracker optical system as a whole acts like a relay lens system that reimages light from an eye plane (e.g., associated with the eye 440) to a camera sensor plane (e.g., associated with the eye tracking IR sensor 134B). In an embodiment, the magnification of the total system is much less than one (a de-magnification) since the eye tracking IR sensor 134B (which can also be referred to as a camera sensor) is much smaller than the object plane (the eye plane). The volume Bragg grating type of input-coupler 414 preferably causes different beams of infrared light that are incident on different horizontal and vertical positions of the volume Bragg grating type of input-coupler 414 to propagate within the waveguide 412 at respective different angles of reflection, and exit the output-coupler 424 at respective different angles of incidence relative to the surface of the waveguide 412 through with the infrared light beams exit. Explained another way, the volume Bragg grating type of input-coupler 414 preferably cause angular encoding of the infrared light beams that are incident on the volume Bragg grating type of input-coupler 414, thereby enabling the infrared light beams that exit the waveguide 412 through the output-coupler 424 to be imaged (e.g., by the eye tracking IR sensor 134B) in a manner that distinguishes between infrared light beams that were incident on different horizontal and vertical positions of the volume Bragg grating type of input-coupler 414.

As mentioned above, the lens power of the volume Bragg grating type of input-coupler 414 preferably has a focal length that is equal to a distance between the eye 440 and the volume Bragg grating type of input-coupler 414, which advantageously causes infrared light (reflected from the eye 440, and incident on the volume Bragg grating type of input-coupler 414) to be collimated within the waveguide. While this is a preferred condition, such a condition is not easy to consistently achieve since different people have differently shaped noses and other facial features and different eye locations. Additionally, each time the same person puts on an HMD device that includes the waveguide 412 and/or adjusts the HMD device, the distance between the person's eye and the volume Bragg grating type of input-coupler 414 may change.

When the focal length of the lens power of the volume Bragg grating type of input-coupler 414 (which can also be referred to simply as the focal length of the volume Bragg grating type of input-coupler 414) is not equal to the distance between the volume Bragg grating type of input-coupler 414 and the eye 440, then infrared light beams traveling within the waveguide 412 by way of total internal reflections will not be perfectly collimated. A problem with this condition is that two or more light beams reflected into the waveguide (through the volume Bragg grating type of input-coupler 414) from the same point on the eye 440, after traveling from the volume Bragg grating type of input-coupler 414 to the output-coupler 424 by way of total internal reflections, will exit the waveguide (through the output-coupler 424) at two or more different locations thereby resulting in multiple (e.g., double, triple, etc.) images being generated by lens module 430 and the eye tracking IR sensor 134B. In other words, two or more beams coming from the same point in the eye plane will be convergent or divergent within the waveguide 412 such that two or more separate images are formed by the eye tracking IR sensor 134B. Such multiple (e.g., double, triple, etc.) imaging is undesirable because it reduces the accuracy of the eye tracking and/or makes it much more complex to perform eye tracking.

Certain embodiments of the present technology reduce and preferably minimize the effects of such multiple imaging that are inherent in the waveguide eye tracker 400 when the distance between the eye 440 and the input-coupler 414 may change. Some such embodiments do this by reducing and preferably minimizing the distance(s) between the multiple images by implementing the input-coupler 414 as a volume Bragg grating type of input-coupler having a very narrow angular bandwidth in the tangential direction (i.e., in the direction of propagation). More specifically, in accordance with an embodiment, the angular bandwidth (ABW) of the volume Bragg grating type of input-coupler 414 is no more than 5 degrees, preferably no more than 2 degrees, more preferably between 1 and 2 degrees, and even more preferably ~1.5 degrees.

As the term is used herein, the angular bandwidth (ABW) of a diffraction grating, such as the volume Bragg grating type of input-coupler 414, is the angular range around the peak diffraction efficiency (DE) of the incident angle within which the DE is greater than or equal to 50% of the peak DE. Accordingly, the ABW can more accurately be referred to herein as the full width half max (FWHM) ABW. Beneficially, a volume Bragg grating having such a narrow ABW can be readily designed and manufactured.

By limiting the ABW to such a narrow angle, the extent that infrared light reflected from the same point on the eye 440 may be non-collimated within the waveguide is significantly limited. In other words, the very narrow ABW of the volume Bragg grating type of input-coupler 414 limits how much infrared light beams that are reflected from the same point on the eye 440 (and enter the waveguide at the input-coupler 414) can deviate from being perfectly collimated within the waveguide 412. More generally, use of a volume Bragg grating type of input-coupler 414 having a narrow AWB limits the cone angle of reflected light from the eye to thereby increase the depth of field of imaging, thereby making the waveguide eye tracker 400 compatible with a range of distances between an eye and the volume Bragg grating type of input-coupler 414.

As is known in the art, a volume Bragg grating is a volume grating with a periodic variation of the refractive index, so that a large diffraction efficiency may be reached in a wavelength range (bandwidth) around a certain wavelength which fulfills the Bragg condition. The diffracted wavelength, $\lambda B$ (which is also known as the Bragg wavelength), is defined by the Bragg condition, $\lambda B = 2 n_{eff} \Lambda$, and is proportional to the waveguide's effective refractive index ($n_{eff}$) and the grating periodicity ($\Lambda$). A volume Bragg grating includes grating planes (also referred to as fringes or Bragg planes) that define the grating periodicity ($\Lambda$). K-vectors of the volume Bragg grating are normal to (i.e., perpendicular to) these Bragg planes. In accordance with an embodiment, the Bragg wavelength, $\lambda B$, is matched to (i.e., substantially equal to) the wavelength of the infrared light that is used for eye tracking.

Referring to FIG. 4B, when an infrared light beam (represented by dashed arrows) is diffracted at the region labeled 418 of the volume Bragg grating type of input-grating 414 (which can also be referred to simply as the volume Bragg grating 414), the infrared light beam is diffracted with high efficiency into waveguide mode due the Bragg condition being met. If the prescription of the volume Bragg grating 414 is exactly the same at the region labeled 420, as it is at the region labeled 418, then the Bragg condition will also be met at the region labeled 420, which will cause a high percentage of the infrared light (represented by the dotted arrows) to be diffracted out of the waveguide at the region labeled 420. This is undesirable since it results in portions of the infrared light that is diffracted into the waveguide 412 (by the volume Bragg grating 414) from not reaching the output-coupler 424, thereby significantly reducing the overall optical efficiency of the device and in image processing terms, reducing the signal-to-noise ratio (SNR).

In accordance with certain embodiments, to reduce and preferably minimize the amount of infrared light that is diffracted out of the waveguide by the volume Bragg grating 414, the prescription of the volume Bragg grating 414 is varied between the lower boundary 415 and upper boundary 416 of the volume Bragg grating 414. This is accomplished by designing the volume Bragg grating 414 such that the k-vector of the volume Bragg grating 414 at the region labeled 420 is shifted sufficiently from the k-vector at the region labeled 418, so that the region labeled 420 no longer meets the Bragg condition completely. This preferably results in the peak of the efficiency curve being shifted in angle sufficiently so as to significantly reduce the amount of infrared light that is diffracted out of the waveguide (i.e., is outcoupled) at the region labeled 420 and other regions of the volume Bragg grating. Additionally, the grating period (i.e., the distance between adjacent Bragg planes), and thus the grating frequency (which is the reciprocal of the grating period), is varied between the lower boundary 415 and upper boundary 416 of the volume Bragg grating 414 to achieve the desired combination of wedge and lens power.

More specifically, in accordance with certain embodiments the volume Bragg grating type of input-coupler 414 has a k-vector angle at its lower boundary 415 that is greater than a k-vector angle at its upper boundary 416, with k-vector angles of the volume Bragg grating type of input-coupler 414 between the lower and upper boundaries 415, 416 gradually decreasing. Such a volume Bragg grating type of input-coupler 414 can be said to have a varying k-vector, or a rolled k-vector. By varying the k-vector angle of the volume Bragg grating type of input-coupler 414 along the direction the infrared light is propagated in the waveguide 412, efficient coupling of the infrared light into the waveguide 412 is achieved in a manner that causes most (and preferably all or significantly all) of the infrared light that is coupled into the waveguide 412 to be transmitted up the waveguide 412 by total internal reflections at which point the infrared light is outcoupled by the output-coupler 424.

In accordance with certain embodiments, the volume Bragg grating type of input-coupler 414 has a grating period (which can also be referred to as a gating spacing) at its lower boundary 415 that is less than the Bragg grating period at its upper boundary 416, with the Bragg grating period of the volume Bragg grating type of input-coupler 414 between the lower and upper boundaries 415, 416 gradually increasing. Such a volume Bragg grating type of input-coupler 414 can be said to have a varying Bragg grating period. This is the same as saying that the volume Bragg grating type of input-coupler 414 has Bragg grating frequency at its lower boundary 415 that is greater than the Bragg grating frequency at its upper boundary 416, with the Bragg grating frequency of the volume Bragg grating type of input-coupler 414 between the lower and upper boundaries 415, 416 gradually decreasing. Such a volume Bragg grating type of input-coupler 414 can be said to have a varying Bragg grating frequency.

In an embodiment, the lens power and the wedge power are achieved by varying the Bragg grating frequency. The lens power focuses light from the eye plane. When the eye relief (distance from the eye pupil plane to the input grating) is equal to the diffractive lens focal length, the light is collimated by the lens power. The wedge power component diffracts this collimated light so that the minimum internal angle in the substrate is beyond the critical angle of the substrate and will therefore be guided within the waveguide. Light incident on a lower portion of the volume Bragg grating type of input-coupler 414 (near the lower boundary 415) is diffracted at a greater angle than the light incident on an upper portion (near the upper boundary 416) and progresses due to the combination of the lens power and the wedge power of the volume Bragg grating type of input-coupler 414. Since the input angles for peak efficiency are all substantially the same, it follows that the first beam of the construction optics for the volume Bragg grating type of input-coupler 414 will be near parallel. Since the diffractive power is varying according to the combination of the diffractive lens power and wedge power it follows that the second construction beam for the Bragg recording will be substantially convergent. The combination of these two beams provides a volume Bragg grating whereby the k-vector is naturally varying, in accordance with an embodiment. Preferably, the two construction beams are optimized such that the diffraction efficiency and diffractive power are optimized to meet the efficiency and geometric properties of the volume Bragg grating type of input-coupler 414.

The table below illustrates exemplary k-vector angles, and Bragg grating periods and frequencies of such a volume Bragg grating type of input-coupler 414 where the total distance between the lower boundary 415 and the upper boundary 416 of is 16 mm.

| Distance from lower boundary of volume Bragg grating (mm) | Ang. of Incidence (degrees) | Diffraction Angle (degrees) | K-vector angle (degrees) | Bragg grating period (um) | Bragg grating frequency (lines/um) |
| --- | --- | --- | --- | --- | --- |
| 0 | 0 | 71.4 | 125.7 | 0.427948438 | 2.3367301 |
| 1 | 0 | 67.85 | 123.925 | 0.447450853 | 2.2348823 |
| 2 | 0 | 64.75 | 122.375 | 0.466377182 | 2.1441872 |
| 3 | 0 | 61.95 | 120.975 | 0.485220537 | 2.0609185 |
| 4 | 0 | 59.3 | 119.65 | 0.504801536 | 1.9809765 |
| 5 | 0 | 56.8 | 118.4 | 0.525048022 | 1.9045877 |
| 6 | 0 | 54.45 | 117.225 | 0.545864943 | 1.831955 |
| 7 | 0 | 52.2 | 116.1 | 0.567636544 | 1.7616907 |
| 8 | 0 | 50.05 | 115.025 | 0.590348649 | 1.6939143 |
| 9 | 0 | 48 | 114 | 0.613973573 | 1.6287346 |
| 10 | 0 | 46.1 | 113.05 | 0.637812749 | 1.5678583 |
| 11 | 0 | 44.25 | 112.125 | 0.663055369 | 1.5081697 |
| 12 | 0 | 42.5 | 111.25 | 0.689015842 | 1.4513454 |
| 13 | 0 | 40.85 | 110.425 | 0.715584986 | 1.3974581 |
| 14 | 0 | 39.25 | 109.625 | 0.743534883 | 1.3449268 |
| 15 | 0 | 37.7 | 108.85 | 0.772924733 | 1.293787 |
| 16 | 0 | 36.2 | 108.1 | 0.803812347 | 1.2440715 |

In the above table, for simplicity and consistency, it is assumed that there is a zero degree angle of incidence of the infrared light beam incident on volume Bragg grating type of input-coupler 414. However, that need not be the case and embodiments described herein are not limited to that condition.

Figure 4C:
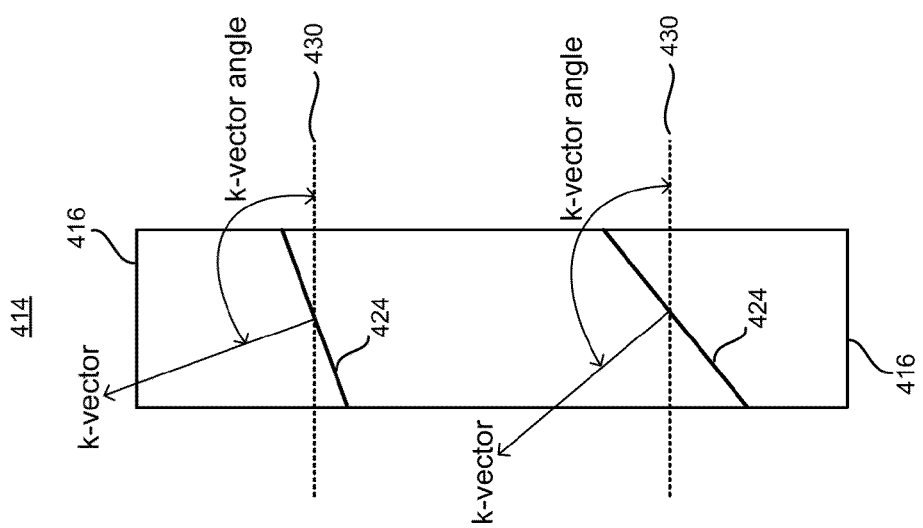
FIG. 4C illustrates exemplary k-vectors and corresponding exemplary k-vector angles of an input-coupler of a waveguide.

K-vectors of a volume Bragg grating (e.g., 414) are, by definition, normal to (i.e., perpendicular to) the Bragg planes of the volume Bragg grating. The term k-vector angle, as used herein, refers to the angle of a k-vector relative to the surface normal of the volume Bragg grating, as can be appreciated from FIG. 4C. Referring to FIG. 4C, shown therein are two Bragg planes 424 (of numerous Bragg planes, the others of which are not shown). Also shown in FIG. 4C are dashed lines 430 which are normal to the surface of the volume Bragg grating 404. Two k-vectors are also shown, each of which is perpendicular to a respective Bragg plane 424, and each of which has a different k-vector angle relative to the surface normal of the Bragg grating 414.

Figure 5:
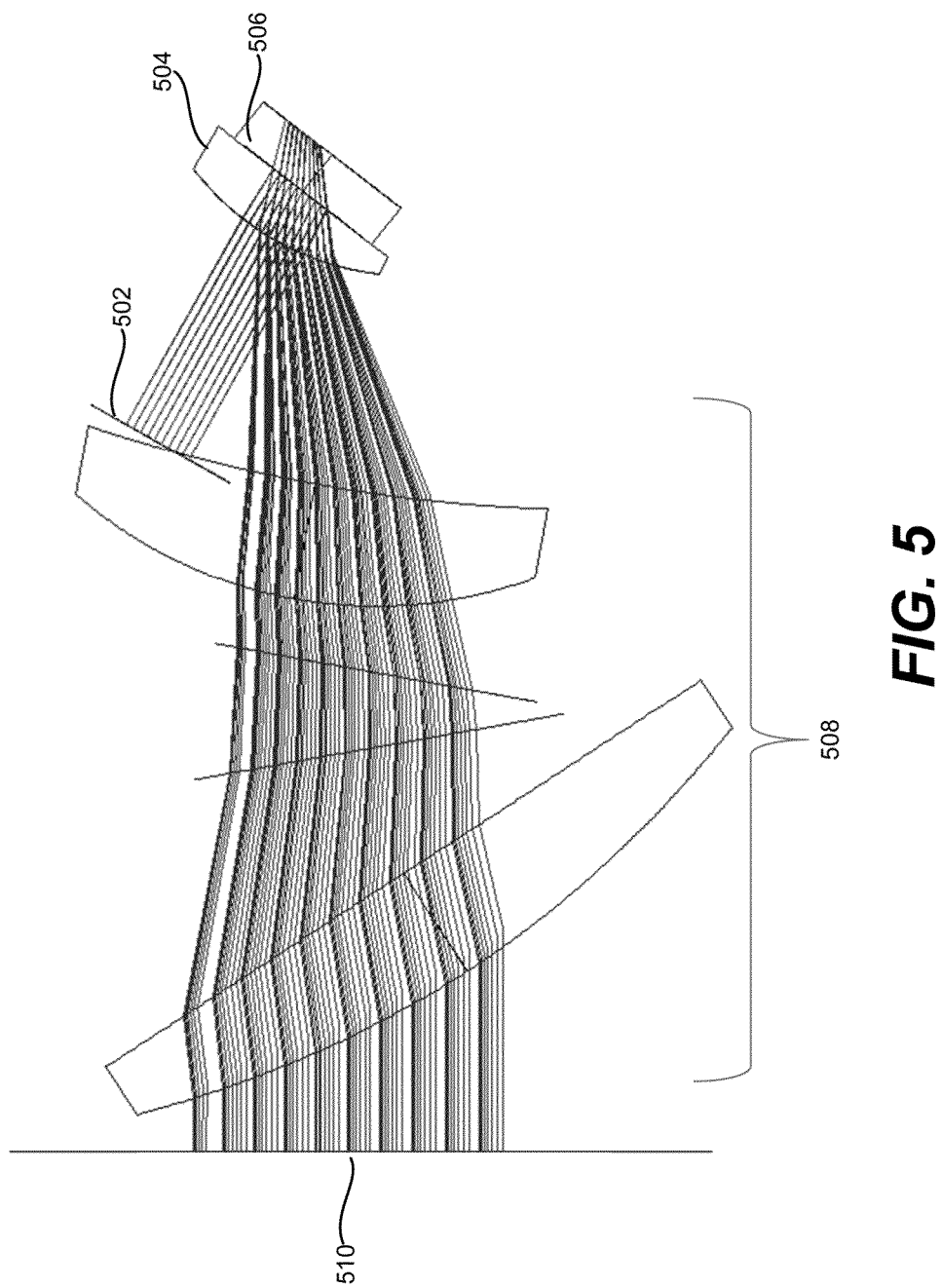
FIG. 5 illustrates how lens power and wedge power can be mathematically combined in a two beam process to generate a phase copy master hologram, which in turn can be used in a contact copy process to produce a volume Bragg grating type of input-grating according to an embodiment.

FIG. 5 illustrates how lens power and wedge power can be combined in a two beam process to generate a master hologram, which in turn can be used in a contact copy process to produce the volume Bragg grating 414. Referring to FIG. 5, shown therein is a first surface 502, a cover lens 504, a holographic recording medium 506 that is used to generate the master hologram being recorded, an off-axis imaging lens system 508, and a second surface 510. The holographic recording medium 506 can be a dichromatic gelatin or a photopolymer, but is not limited thereto. A first beam is generated by a collimated beam emanating from the first surface 502. The first beam is converged by a cover lens 504 before it is incident on the recording medium 506. A second beam is generated by a collimated beam emanating from the second surface 510. This beam is modified by the off-axis imaging lens system 508 and the cover lens 504 before being incident on the recording medium. These two beams interfere with one another to produce an interference pattern in the holographic recording medium 506 to thereby generate the master hologram. Such a master hologram can then be used to mass produce the volume Bragg gratings 414 using contact copying. The lens or diffractive power of the contact copy will only be the same if the master hologram is in direct contact with the copy. Where there is a gap or distance between the master and the copy, the master hologram should be designed to compensate for this gap.

Figure 6:
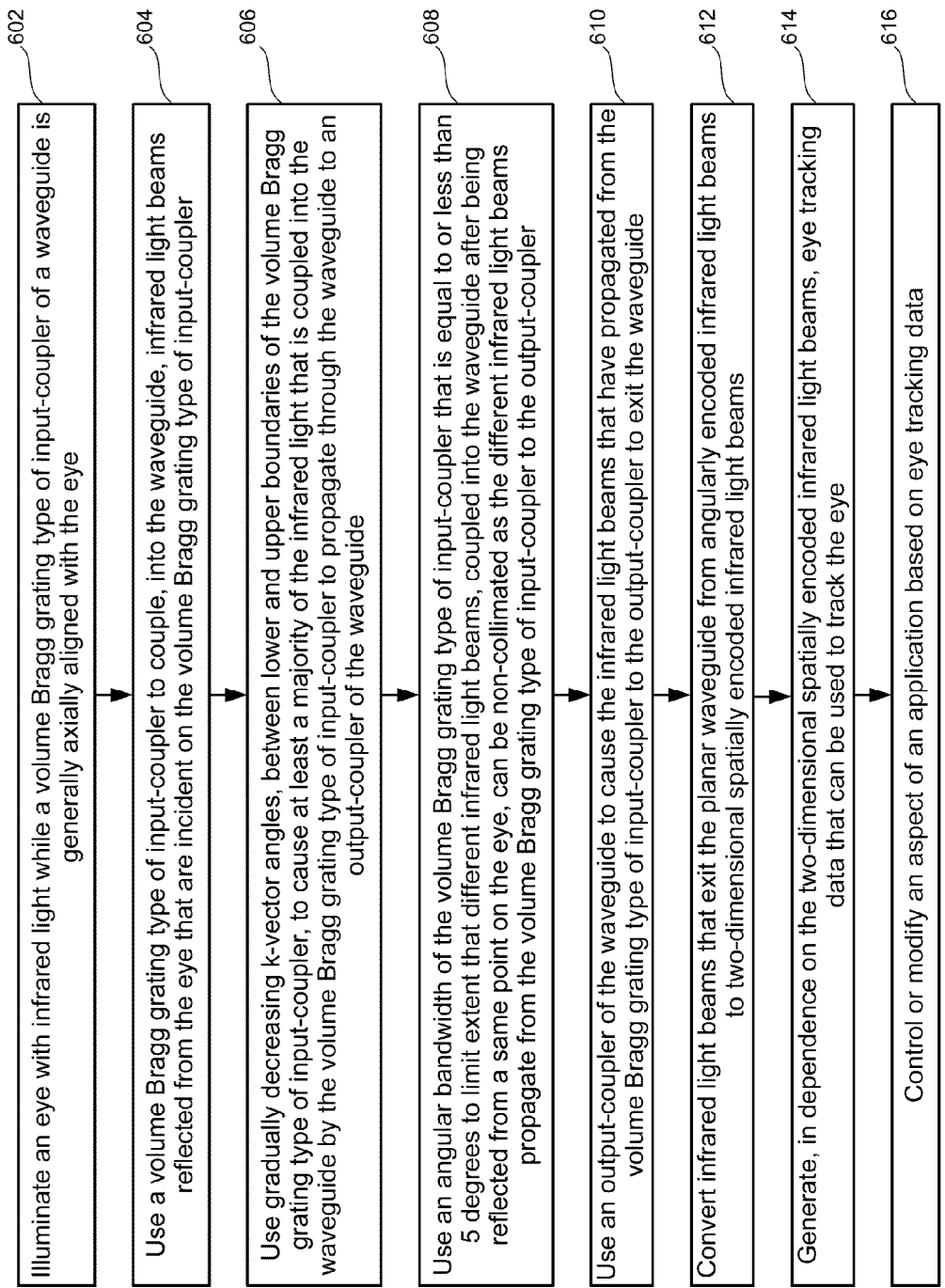
FIG. 6 is a high level flow diagram that is used to summarize a method for use in tracking an eye.

FIG. 6 is a flowchart that is used to summarize a method for use in eye tracking. Referring to FIG. 6, at step 602, an eye is illuminated with infrared light while a volume Bragg grating type of input-coupler of a waveguide is generally axially aligned with the eye. As indicated at step 604, the volume Bragg grating type of input-coupler is used to couple, into the waveguide, infrared light beams reflected from the eye that are incident on the volume Bragg grating type input-coupler. Step 606 involves using gradually decreasing k-vector angles, between lower to upper boundaries of the volume Bragg grating type of input-coupler, to cause at least a majority of (and preferably all or significantly all of) the infrared light that is coupled into the waveguide by the volume Bragg grating type of input-coupler to propagate within the waveguide to an output-coupler of the waveguide. Step 608 involves using an angular bandwidth of the volume Bragg grating type of input-coupler that is equal to or less than 5 degrees to limit an extent that different infrared light beams, coupled into the waveguide after being reflected from a same point on the eye, can be non-collimated as the different infrared light beams propagate from the volume Bragg grating type of input-coupler to the output-coupler. While steps 604, 606 and 608 are shown as three separate steps, such steps are likely performed simultaneously.

As indicated at step 610, the output-coupler of the waveguide is used to cause the infrared light beams that have propagated from the volume Bragg grating type of input-coupler to the output-coupler to exit the waveguide.

As indicated at step 612, the infrared light beams that exit the planar waveguide are converted from angularly encoded infrared light beams to two-dimensional spatially encoded infrared light beams. This can be achieved using a lens module (e.g., 430).

As indicated at step 614, eye tracking data that can be used to track the eye is generated in dependence on the two-dimensional spatially encoded infrared light beams. As was explained above, this can be achieved using an eye tracking IR sensor (e.g., 134B). The sensor can be, e.g., a charge-coupled device (CCD) or CMOS pixel sensor array, but is not limited thereto. Some examples of eye tracking data are image data from an infrared camera or positions detected for glints by a position sensitive detector (PSD). Eye tracking data can be used, for example, to determine a point of gaze, which indicates one or more objects, real or virtual, at which a user is gazing. In other words, eye tracking data can be used to determine a direction or object at which the user is looking. Eye tracking, as is known in the art, can involve measuring vergence, inter-pupillary distance (IPD), gaze determination, eye movement based commands, biometric identification, but is not limited thereto.

The position of the pupil within the eye socket can be identified by known imaging techniques when the IR sensor is an IR camera, and by glint position data when the IR sensor is a type of position sensitive detector (PSD). For a more specific example, the position of the pupil can be identified by known imaging techniques which detects the reflection of the cornea, e.g., as disclosed in U.S. Pat. No. 7,401,920, entitled "Head Mounted Eye Tracking and Display System", issued Jul. 22, 2008 to Kranz et al. Such a technique can locate a position of the center of the eye relative to a tracking camera (e.g., eye tracking IR sensor 134B). Generally, eye tracking involves obtaining an image of the eye and using computer vision techniques to determine the location of the pupil within the eye socket. In one embodiment, it is sufficient to track the location of one eye since the eyes usually move in unison. However, it is also possible to track each eye separately. Where two eyes are being tracked, there can be a separate one of the waveguides 412 described herein for each one of the eyes. Another example of a patent that describes techniques for tracking an eye based on reflected infrared light and generating eye tracking data is U.S. Pat. No. 8,487,838, entitled "Gaze Detection in a See-Through, Near-Eye, Mixed Reality Display," issued Jul. 16, 2013, to Lewis et al.

As indicated at step 616, an aspect of an application is controlled or modified based on the eye tracking data. Step 616 can be performed, e.g., using a processor (e.g., 210 or 320). Step 616 can involve, for example, enabling a user to make a selection from a list, enabling a user to control how an avatar proceeds through a virtual environment, or causing certain virtual objects to be emphasized, but are not limited thereto. Step 616 can additionally, or alternatively, involve observing a user's reactions to certain visual stimuli, or the like.

The waveguides disclosed herein advantageously can be employed with eye tracking hardware in a manner that does not impair the see-through properties of the mixed reality display device system. Further, the waveguides disclosed herein enables imaging of the eye the works with all types of prescription spectacles, and enables imaging of the eye that covers the entire eye movement range plus an inter-pupillary distance range.

In the Figures, the waveguide 412 was typically shown as being a waveguide that includes a pair of planar surfaces. In an alternative embodiment, surfaces of the waveguide could be non-planar, i.e., curved. While gratings may be more easily manufacture on or in planar surfaces, with curved surface(s) it could be possible to reduce some of the aberrations in the system.

Certain embodiments described herein are directed to an apparatus for use in tracking an eye that is illuminated by infrared light having an infrared wavelength, wherein the apparatus comprises a waveguide that is transparent and includes an input-coupler and an output-coupler. The output-coupler can be a linear grating, a holographic grating or a prism, but is not limited thereto. The input-coupler comprises a volume Bragg grating that is adapted to receive infrared light having the infrared wavelength and couple the received infrared light into the waveguide. The volume Bragg grating includes a lower boundary and an upper boundary, with the upper boundary being closer to the output-coupler than the lower boundary. Additionally, the volume Bragg grating has a k-vector angle at the lower boundary that is greater than a k-vector angle at the upper boundary, with k-vector angles of the volume Bragg grating between the lower and upper boundaries gradually decreasing as distances decrease between grating planes of the volume Bragg grating and the upper boundary. The volume Bragg grating has a Bragg wavelength that is matched to the infrared wavelength of the infrared light that illuminates the eye being tracked. The volume Bragg grating has a grating period at its lower boundary that is less than the grating period at its upper boundary, with the grating period of the volume Bragg grating between the lower and upper boundaries gradually increasing. The volume Bragg grating includes both lens power and prismatic power, wherein the lens power of the volume Bragg grating specifies a focal length of the volume Bragg grating, and the prismatic power of the volume Bragg grating causes infrared light that is received by the volume Bragg grating to be coupled into the waveguide. An angular bandwidth of the volume Bragg grating is equal to or less than 5 degrees, and is preferably between 1 and 2 degrees. When the input-coupler is positioned in front of an eye that is illuminated with the infrared light, at least a portion of the infrared light reflected from the eye and received by the input-coupler is coupled into the waveguide at the input-coupler, propagates within the waveguide from the input-coupler to the output-coupler by way of total internal reflections, and exits the waveguide proximate the output-coupler. To substantially achieve telecentricity, an angular bandwidth of each point of the input-coupler is substantially centered on a chief ray of the input-coupler, with all chief rays of the input-coupler being substantially parallel to one another.

Certain embodiments described herein are directed to a method for use in tracking an eye, wherein the method includes illuminating an eye with infrared light while a volume Bragg grating type of input-coupler of a waveguide is generally axially aligned with the eye, and using the volume Bragg grating type of input-coupler to couple, into the waveguide, infrared light beams reflected from the eye that are incident on the volume Bragg grating type input-coupler. Such a method also includes using gradually decreasing k-vector angles, between lower and upper boundaries of the volume Bragg grating type of input-coupler, to cause at least a majority of the infrared light that is coupled into the waveguide by the volume Bragg grating type of input-coupler to propagate within the waveguide to an output-coupler of the waveguide. Further, such a method also includes using the output-coupler of the waveguide, to cause the infrared light beams that have propagated from the volume Bragg grating type of input-coupler to the output-coupler to exit the waveguide. Further, an angular bandwidth of the volume Bragg grating type of input-coupler that is equal to or less than 5 degrees is used to limit an extent that different infrared light beams, coupled into the waveguide after being reflected from a same point on the eye, are non-collimated as the different infrared light beams propagate from the volume Bragg grating type of input-coupler to the output-coupler. Additionally, the infrared light beams that exit the waveguide are converted from angularly encoded infrared light beams to two-dimensional spatially encoded infrared light beams. The method can also include generating, in dependence on the two-dimensional spatially encoded infrared light beams, eye tracking data that used to track the eye, and controlling or modifying an aspect of an application based on the eye tracking data.

Certain embodiments described herein are directed to a system for use in tracking an eye. Such as system comprises an infrared illumination source that produces infrared light used to illuminate an eye. The system also includes a waveguide that is transparent and includes an input-coupler and an output-coupler. The input-coupler comprises a volume Bragg grating adapted to receive infrared light having the infrared wavelength and couple the received infrared light into the waveguide. The volume Bragg grating includes a lower boundary and an upper boundary, the upper boundary being closer to the output-coupler than the lower boundary. The volume Bragg grating has a k-vector angle at the lower boundary that is greater than a k-vector angle at the upper boundary, with k-vector angles of the volume Bragg grating between the lower and upper boundaries gradually decreasing as distances decrease between grating planes of the volume Bragg grating and the upper boundary. The volume Bragg grating has a Bragg wavelength that is matched to the infrared wavelength of the infrared light for use in eye tracking. The volume Bragg grating includes both lens power and prismatic power, wherein the lens power of the volume Bragg grating specifies a focal length of the volume Bragg grating, and the prismatic power of the volume Bragg grating causes infrared light that is received by the volume Bragg grating to be coupled into the waveguide. An angular bandwidth of the volume Bragg grating is equal to or less than 5 degrees. The system also includes a lens module that converts the infrared light beams that exit the waveguide at the output-coupler from angularly encoded infrared light beams to two-dimensional spatially encoded infrared light beams. The system further includes a sensor that produces eye tracking data in dependence on the two-dimensional spatially encoded infrared light beams produced using the lens module. Additionally, the system includes a processor that controls or modifies an aspect of an application based on the eye tracking data.

Embodiments of the present technology have been described above with the aid of functional building blocks illustrating the performance of specified functions and relationships thereof. The boundaries of these functional building blocks have often been defined herein for the convenience of the description. Alternate boundaries can be defined so long as the specified functions and relationships thereof are appropriately performed. Any such alternate boundaries are thus within the scope and spirit of the present technology. For example, it would be possible to combine or separate some of the steps shown in FIG. 6. For another example, it is possible to change the boundaries of some of the blocks shown in FIGS. 3A and 3B.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the technology be defined by the claims appended hereto.

What is claimed is:

1. An apparatus for use in tracking an eye that is illuminated by infrared light having an infrared wavelength, the apparatus comprising:
   a waveguide that is transparent and includes an input-coupler and an output-coupler;
   the input-coupler comprising a volume Bragg grating adapted to receive infrared light having the infrared wavelength that is reflected from an eye and couple the received infrared light into the waveguide so that at least a portion of the infrared light that is coupled into the waveguide travels by way of total internal reflection to the output-coupler of the waveguide;
   a lens module that converts infrared light that exits the waveguide at the output-coupler from angularly encoded infrared light to spatially encoded infrared light; and
   a sensor that produces eye tracking data in dependence on the spatially encoded infrared light produced using the lens module;
   the volume Bragg grating including a lower boundary and an upper boundary, the upper boundary being closer to the output-coupler than the lower boundary;
   the volume Bragg grating having a k-vector angle at the lower boundary that is greater than a k-vector angle at the upper boundary, with k-vector angles of the volume Bragg grating between the lower and upper boundaries gradually decreasing as distances decrease between grating planes of the volume Bragg grating and the upper boundary;
   the volume Bragg grating having a grating period at the lower boundary that is less than the grating period at the upper boundary, with the grating period of the volume Bragg grating between the lower and upper boundaries gradually increasing; and
   the volume Bragg grating having a narrow angular bandwidth that is no more than 5 degrees.

2. The apparatus of claim 1, wherein the volume Bragg grating has a Bragg wavelength that is matched to the infrared wavelength of the infrared light that illuminates the eye being tracked.

3. The apparatus of claim 1, wherein:
   the volume Bragg grating includes both lens power and prismatic power;
   the lens power of the volume Bragg grating specifies a focal length of the volume Bragg grating; and
   the prismatic power of the volume Bragg grating causes infrared light that is received by the volume Bragg grating to be coupled into the waveguide.

4. The apparatus of claim 1, wherein the narrow angular bandwidth of the volume Bragg grating is between 1 and 2 degrees.

5. The apparatus of claim 1, wherein when the input-coupler is positioned in front of an eye that is illuminated with the infrared light, at least a portion of the infrared light reflected from the eye and received by the input-coupler is coupled into the waveguide at the input-coupler, propagates within the waveguide from the input-coupler to the output-coupler by way of total internal reflections, and exits the waveguide proximate the output-coupler.

6. The apparatus of claim 1, wherein to substantially achieve telecentricity an angular bandwidth of each point of the input-coupler is substantially centered on a chief ray of the input-coupler, with all chief rays of the input-coupler being substantially parallel to one another.

7. The apparatus of claim 1, wherein the output-coupler comprises a linear grating, a holographic grating or a prism.

8. The apparatus of claim 1, wherein an angular bandwidth of the volume Bragg grating is equal to or less than 5 degrees.

9. A method for use in tracking an eye, the method comprising:
   illuminating an eye with infrared light while a volume Bragg grating type of input-coupler of a waveguide is generally axially aligned with the eye;
   using the volume Bragg grating type of input-coupler to couple, into the waveguide, infrared light beams reflected from the eye that are incident on the volume Bragg grating type input-coupler;
   using gradually decreasing k-vector angles, between lower and upper boundaries of the volume Bragg grating type of input-coupler, to cause at least a majority of the infrared light that is coupled into the waveguide by the volume Bragg grating type of input-coupler to propagate within the waveguide to an output-coupler of the waveguide, the volume Bragg grating having a grating period at the lower boundary that is less than the grating period at the upper boundary;
   using an angular bandwidth of the volume Bragg grating type of input-coupler that is equal to or less than 5 degrees to limit an extent that different infrared light beams, coupled into the waveguide after being reflected from a same point on the eye, are non-collimated as the different infrared light beams propagate from the volume Bragg grating type of input-coupler to the output-coupler;
   using the output-coupler of the waveguide, causing the infrared light beams that have propagated from the volume Bragg grating type of input-coupler to the output-coupler to exit the waveguide; and
   converting the infrared light beams that exit the waveguide from angularly encoded infrared light beams to two-dimensional spatially encoded infrared light beams.

10. The method of claim 9, further comprising:
    generating, in dependence on the two-dimensional spatially encoded infrared light beams, eye tracking data that used to track the eye.

11. The method of claim 10, further comprising:
    controlling or modifying an aspect of an application based on the eye tracking data.

12. A system for use in tracking an eye, comprising:
    an infrared illumination source that produces infrared light used to illuminate an eye;
    a waveguide that is transparent and includes an input-coupler and an output-coupler;
    a lens module that converts the infrared light beams that exit the waveguide at the output-coupler from angularly encoded infrared light beams to two-dimensional spatially encoded infrared light beams;
    a sensor that produces eye tracking data in dependence on the two-dimensional spatially encoded infrared light beams produced using the lens module;
    the input-coupler comprising a volume Bragg grating adapted to receive infrared light having the infrared wavelength and couple the received infrared light into the waveguide so that at least a portion of the infrared light that is coupled into the waveguide travels by way of total internal reflection to the output-coupler of the waveguide;
    the volume Bragg grating including a lower boundary and an upper boundary, the upper boundary being closer to the output-coupler than the lower boundary;

the volume Bragg grating having a k-vector angle at the lower boundary that is greater than a k-vector angle at the upper boundary, with k-vector angles of the volume Bragg grating between the lower and upper boundaries gradually decreasing as distances decrease between grating planes of the volume Bragg grating and the upper boundary;

the volume Bragg grating having a grating period at the lower boundary that is less than the grating period at the upper boundary, with the grating period of the volume Bragg grating between the lower and upper boundaries gradually increasing; and the volume Bragg grating having a narrow angular bandwidth that is between 1 and 2 degrees.

13. The system of claim 12, wherein:

the volume Bragg grating has a Bragg wavelength that is matched to the infrared wavelength of the infrared light for use in eye tracking;

the volume Bragg grating includes both lens power and prismatic power;

the lens power of the volume Bragg grating specifies a focal length of the volume Bragg grating; and the prismatic power of the volume Bragg grating causes infrared light that is received by the volume Bragg grating to be coupled into the waveguide.

14. The system of claim 12, further comprising:

a processor that controls or modifies an aspect of an application based on the eye tracking data.

* * * * *